United States Patent
Shukla et al.

(10) Patent No.: US 9,604,859 B2
(45) Date of Patent: Mar. 28, 2017

(54) PROCESS FOR DECOMPOSITION OF ORGANIC SYNTHETIC-DYES USING SEMICONDUCTOR-OXIDES NANOTUBES VIA DARK-CATALYSIS

(71) Applicant: COUNCIL OF SCIENTIFIC & INDUSTRIAL RESEARCH, New Delhi (IN)

(72) Inventors: Satyajit Vishnu Shukla, Kerala (IN); Krishna Gopakumar Warrier, Kerala (IN); Babitha Kunnathuparambil Babu, Kerala (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 14/421,904

(22) PCT Filed: May 17, 2013

(86) PCT No.: PCT/IN2013/000319
§ 371 (c)(1),
(2) Date: Feb. 16, 2015

(87) PCT Pub. No.: WO2014/027364
PCT Pub. Date: Feb. 20, 2014

(65) Prior Publication Data
US 2015/0203365 A1    Jul. 23, 2015

(30) Foreign Application Priority Data
Aug. 17, 2012 (IN) .......................... 2555/DEL/2012

(51) Int. Cl.
*C02F 1/28* (2006.01)
*C02F 1/72* (2006.01)
(Continued)

(52) U.S. Cl.
CPC .............. *C02F 1/281* (2013.01); *C02F 1/722* (2013.01); *C02F 1/725* (2013.01); *C02F 1/385* (2013.01);
(Continued)

(58) Field of Classification Search
None
See application file for complete search history.

(56) References Cited

U.S. PATENT DOCUMENTS

| | | | | |
|---|---|---|---|---|
| 6,027,775 A | * | 2/2000 | Kasuga | .................... A61K 8/02 428/34.1 |
| 6,537,517 B1 | * | 3/2003 | Kasuga | .................... A61K 8/02 423/610 |

FOREIGN PATENT DOCUMENTS

WO    2007/141781 A2    12/2007

OTHER PUBLICATIONS

Janotti, etal., "Fundamentals of zinc oxide as a semiconductor," Rep. Prog. Phys. 72(2009) 126501 (29 pp).*
(Continued)

*Primary Examiner* — Chester Barry
(74) *Attorney, Agent, or Firm* — Baker and Hostetler LLP

(57) ABSTRACT

In the present invention nanotubes-based dye-adsorbent powder is used for adsorption and decomposition of synthetic dye under dark-condition without the use of any external power-source such as the applied potential-difference, microwave, ultrasonicator, and others to save the energy consumption, which results in a complete dye-decomposition on the powder-surface. The surface-cleaned dye-adsorbent powder has very high specific surface-area and dye-adsorption capacity comparable with those of the original dye-adsorbent powder and can be recycled for the next cycles of dye-adsorption and dye-decomposition under the dark-condition. In the present method, the nanotubes-
(Continued)

based dye-adsorbent powder is stirred under the dark-condition in an aqueous dye solution containing a strong oxidizer to get simultaneous dye-adsorption and dye-decomposition on the powder-surface, or getting dye adsorption in one solution and dye decomposition in a separate solution by said adsorbent powder under dark condition.

10 Claims, 21 Drawing Sheets

(51) Int. Cl.
      *C02F 1/38*     (2006.01)
      *C02F 101/30*   (2006.01)

(52) U.S. Cl.
    CPC .... *C02F 2101/308* (2013.01); *C02F 2303/18* (2013.01); *C02F 2305/08* (2013.01); *Y02W 10/37* (2015.05)

(56) References Cited

OTHER PUBLICATIONS

Kuratomi, et al., "Semiconducting properties of polycrystalline titanium dioxide," Solid State Ionics, 154-155 (2002) 223-228.*
International Search Report mailed Sep. 23, 2013 from Application No. PCT/IN2013/000319.
"NiO(111) nanosheets as efficient and recyclable adsorbents for dye pollutant removal from wastewater" by Zhi Song et al., Nanotechnology, 10P, Bristol, GB, vol. 20, No. 27, Jul. 8, 2009, p. 275707, XP020160681, ISSN: 0957-4484.
"Magnetic Dye-Adsorbent Catalyst: Processing, Characterization, and Application" by Lijina Thazhe et al., Journal of the American Ceramic Society, Blackwell Publishing, Malden, MA, US, vol. 93, No. 11, Nov. 1, 2010, pp. 3642-3650, XP002621557, ISSN: 0002-7820, DOI: 10.1111/J.1551-2916.2010.03949.X.

* cited by examiner

Contact Time (min)

Dye-Adsorption Cycle (#)

| Process | Surface Cleaning Treatment | Nanotubes $H_2Ti_3O_7$ | Anatase-$TiO_2$ |
|---|---|---|---|
| Two-Step | UV | 1.8 | 0.6 |
| | Sunlight | 2.2 | 0.8 |
| | Dark | 2.2 | 0.9 |
| One-Step | Dark | 17 | 16 |

Figure 21

PROCESS FOR DECOMPOSITION OF ORGANIC SYNTHETIC-DYES USING SEMICONDUCTOR-OXIDES NANOTUBES VIA DARK-CATALYSIS

CROSS-REFERENCE TO RELATED PATENT APPLICATIONS

The present application is a National Stage of International Patent Application No. PCT/IN2013/000319, filed May 17, 2013 and claims the priority of Indian Patent Application No. 2555/DEL/2012, filed on Aug. 17, 2012, entitled "A Process for Decomposition of Organic Synthetic-Dyes Using Semiconductor-Oxides Nanotubes via Dark-Catalysis", the disclosures of which are incorporated herein by reference in their entirety.

The present invention relates to a process for decomposition of organic synthetic dye decomposition using semiconductor oxide nanotubes via dark catalysis useful for the waste-water purification involving the removal of harmful organic synthetic-dyes from an aqueous solution, under the dark-condition via surface-adsorption mechanism. More particularly, the present invention relates to method for removal of organic synthetic dye from waste water by titanate based nanotubes such as $H_2Ti_3O_7$, anatase-$TiO_2$ via simultaneous (one step method) or in separate bath (two step method) decomposition of the adsorbed-dye, adsorbed on the surface of dye-adsorbent, under the dark-condition, said method is useful for recycling the nanotubes-based dye-adsorbent as a catalyst.

MAIN FIELD AND USAGE(S)/UTILITY

Methods for Decomposition of Organic Synthetic-Dyes using Semiconductor-Oxides Nanotubes via Dark-Catalysis finds application in removing the harmful organic synthetic-dyes from the waste-water, under the dark-condition via surface-adsorption mechanism, using the nanotubes-based dye-adsorbent (including the magnetic dye-adsorbent, consisting nanotubes-coating on the surface of magnetic ceramic particles), and the simultaneous or occurring in a separate bath decomposition of the adsorbed-dye on the surface of nanotubes-based dye-adsorbent, under the dark-condition, which make it possible to reuse the nanotubes-based dye-adsorbent, as a catalyst, for the next-cycles of dye-adsorption and/or dye-decomposition under the dark-condition.

PRIOR ART AND ITS DRAWBACKS

Water purification via photocatalysis has gained significant attention over the past three decades. Organic synthetic-dyes are extensively used in various industries such as textile, leather tanning, paper production, food technology, agricultural research, light-harvesting arrays, photo-electrochemical cells, and hair-coloring. Due to their large-scale production, extensive use, and subsequent discharge of colored waste-water, the toxic and non-biodegradable organic synthetic-dyes cause considerable environmental pollution and health-risk factors. Moreover, they also affect the sunlight penetration and oxygen solubility in the water-bodies, which in turn affect the under-water photosynthetic activity and life-sustainability. In addition to this, due to their strong color even at lower concentrations, the organic synthetic-dyes generate serious aesthetic issues in the waste-water disposal. Therefore, the removal of highly stable organic synthetic-dyes from an aqueous solution is of prime importance.

Photocatalysis has been the most promising technique for the removal of toxic organic synthetic-dyes from the waste-water. The nanocrystalline semiconductor titania ($TiO_2$) has been the most commonly applied photocatalyst since it is inexpensive, chemically stable, and its photo-generated holes and electrons are highly oxidizing and reducing for degrading the dye molecules present in an aqueous solution ([1]A. Fujishima, X. Zhang, D. A. Tryk, *Surface Science Reports* 2008, 63, 515-582; [2]X. Chen, S. S. Mao, *Chemical Reviews* 2007, 107, 2891-2959; [3]T. Tachikawa, M. Fujitsuka, T. Majima, *Journal of Physical Chemistry C* 2007, 111, 5259-5275; [4]O. Carp, C. L. Huisman, A. Reller, *Progress in Solid State Chemistry* 2004, 32, 33-177; [5]S. M. Karvinen; R.-J. Lamminmaki, U.S. Pat. No. 7,138,357; [6]S. Iwamoto, M. Inoue, H. Ozaki, U.S. Pat. No. 7,153,808; [7]J. Tanaka, M. Sanbayashi, Y. Ueyoshi, U.S. Pat. No. 7,378,371; [8]C. Bygott, M. Ries, S. P. Kinniard, U.S. Pat. No. 7,521,039; [9]J. Meyer, H. Gilges, I. Hemme, A. Moiseev, S.-U. Geissen, U.S. Pat. No. 6,508,941; [10]S. E. Pratsinis, S. Vemury, G. P. Fotou, A. Gutsch, U.S. Pat. No. 5,698,177). In the photocatalysis, the photocatalyst particles are dispersed in an aqueous dye-solution, which are exposed to an external-radiation (ultraviolet (UV), visible, or solar) having energy comparable or higher than the band-gap energy of the semiconductor photocatalyst. The electron-hole pairs created within the particle volume, as a result of the radiation-exposure, travel to the particle surface and take part in the redox reactions generating the OH. which attack and degrade the surface-adsorbed dye molecules. The major drawbacks of the prior art are as follows:

1. Radiation-exposure is required for the removal of an organic synthetic-dye from an aqueous solution when $TiO_2$-based photocatalyst particles are used, which makes the dye-removal process expensive and dangerous. Hence, the dye-removal under the dark-condition is essential.

2. Band-gap tuning, using the dopants, is required to use the $TiO_2$-based particles as photocatalyst under an exposure to the visible- and solar-radiations, which makes the dye-removal process expensive due to the requirement of additional chemicals. Hence, the dye-removal under the dark-condition, without the band-gap energy tuning via dopants, is essential.

3. $TiO_2$-based photocatalyst particles are ineffective for the dye-removal application under the dark-condition even with the use of dopants.

4. The traditional methods used for the separation of photocatalyst particles from the treated aqueous solution such as coagulation, flocculation, and sedimentation are very tedious and expensive.

In order to ease the separation of $TiO_2$-based photocatalysts, the photocatalyst particles are coated on the surface of magnetic ceramic particles, known as "Magnetic Photocatalyst", which makes their separation from an aqueous solution possible using an external magnetic field ([11]R. Amal, D. Beydoun, G. Low, S. Mcevoy, U.S. Pat. No. 6,558,553; [12]H. Koinuma, Y. Matsumoto, U.S. Pat. No. 6,919,138; [13]D. K. Misra, U.S. Pat. No. 7,504,130). The major advantage of the conventional technology is the ease of solid-liquid separation and the recyclability of the magnetic photocatalyst particles since their surfaces remain clean after the photocatalysis process. However, the main drawbacks of prior art are as follows:

1. Due to the reduced weight-fraction of the photocatalyst particles in a given amount of magnetic photocatalyst, the total time required for the dye-decomposition using the latter is considerably larger.
2. Due to their lower specific surface-area, the magnetic photocatalyst is not suitable for the dye-removal in the dark-condition via surface-adsorption process involving the electrostatic attraction and ion-exchange mechanisms.
3. The dye-decomposition typically in the dark-condition cannot be obtained using the magnetic photocatalyst.

The nanotubes of hydrogen titanate ($H_2Ti_3O_7$) and anatase-$TiO_2$ have been recently utilized for the removal of organic synthetic-dyes from an aqueous solution ([14]K. V. Baiju, S. Shukla, S. Biju, M. L. P. Reddy, K. G. K. Warder, *Catalysis Letters* 2009, 131, 663-671; [15]K. V. Baiju, S. Shukla, S. Biju, M. L. P. Reddy, K. G. K. Warder, *Materials Letters* 2009, 63, 923-926; [16]C.-K. Lee, S.-S. Liu, L.-C. Juang, C.-C. Wang, M.-D. Lyu, S.-H. Hung, *Journal of Hazardous Materials* 2007, 148, 756-760; [17]C.-K. Lee, K-S. Lin, C.-F. Wu, M.-D Lyu, C.-C. Lo, *Journal of Hazardous Materials* 2008, 150, 494-503; [18]M.-W. Xiao, L.-S. Wang, Y.-D. Wu, X.-J. Huang, Z. Dang, *Journal of Solid State Electrochemistry* 2008, 122, 1159-1166; [19]T. Kasuga, H. Masayoshi, U.S. Pat. Nos. $6,027,775^a$ and $6,537,517^b$). Due to very high specific surface-area, they primarily remove an organic synthetic-dye from an aqueous solution via surface-adsorption process through the electrostatic attraction and ion-exchange mechanisms ([20]D. V. Bavykin, K. E. Redmond, B. P. Nias, A. N. Kulak, F. C. Walsh, *Australian Journal of Chemistry* 2010, 63, 270-275; [21]V. K. Gupta, Suhas, *Journal of Environmental Management* 2009, 90, 2313-2342, [22]X. Sun, Y. Li, *Chemistry—A European Journal* 2003, 9, 2229-2238; [23]N. Harsha, K. R. Ranya, K. B. Babitha, S. Shukla, S. Biju, M. L. P. Reddy, K. G. K. Warrier, *Journal of Nanoscience and Nanotechnology* 2011, 11, 1175-1187). Since these mechanisms operate effectively even under the dark-condition (that is, without any exposure to the external-radiation (UV, visible, fluorescent, solar, or heat), they provide a cost-effective approach for the removal of organic synthetic-dyes from an aqueous solution. To ease the separation of nanotubes using an external magnetic field, after the dye-adsorption process, a "Magnetic Dye-Adsorbent Catalyst" has been developed ([24]S. Shukla, K. G. K. Warrier, M. R. Varma, M. T. Lajina. N. Harsha, C. P. Reshmi, PCT Application No. PCT/IN2010/000198, Taiwan Patent Application No. 99109754, Indian Patent Application No. 0067DEL2010; [25]L. Thazhe, A. Shereef, S. Shukla, R. Pattelath, M. R. Varma, K. G. Suresh, K. Patil, K. G. K. Warrier, *Journal of American Ceramic Society* 2010, 93(11), 3642-3650). The magnetic dye-adsorbent catalyst, thus, removes an organic synthetic-dye from an aqueous solution via surface-adsorption mechanism under the dark-condition and can be separated using an external magnetic field. The recycling of the graphene oxide-iron oxide ($Fe_3O_4$) magnetic nanocomposite particles by decomposing the adsorbed-dye via thermal treatment has been reported ([26]Z. Geng, Y. Lin, X. Yu, Q. Shen, L. Ma, Z. Li, N. Pan, X. Wang, *Journal of Materials Chemistry* 2012, 22, 3527-3535). The simultaneous adsorption and decomposition of organic synthetic-dye using the $TiO_2$-based nanotubes and the subsequent recycling of latter have been shown under the UV-radiation and microwave/UV-radiation exposure ([27]A. G. S. Prado and L. L. Costa, *Journal of Hazardous Materials* 2009, 169, 297-301; [28]S.-J. Kim, Y-S. Lee, B. H. Kim, S.-G. Seo, S. R. Park, S. C. Jung, *International Journal of Photoenergy* 2012, Vol. 2012, Article ID 901907, 6 pages), and in the dark-condition under the application of external potential-difference (Voltage-Induced Dark-Photocatalysis) and ultrasonic-power (50 W and 35 kHz) in the presence of hydrogen peroxide ($H_2O_2$) to generate the hydroxyl-radicals (OH.) which attack and decompose the organic synthetic-dye ([29]Y.-Y. Song, P. Roy, I. Paramasivam, and P. Schmuki, *Angewandte Chemie* 2010, 122, 361-364; [30]Y. L. Pang, A. Z. Abdullah, S. Bhatia, *Journal of Applied Sciences* 2010, 10(12), 1068-1075). The recycling of adsorbents such as the activated carbon and zeolites and the dye-decomposition without the use of adsorbents via Fenton-driven oxidation ($Fe^{2+}+H_2O_2 \rightarrow Fe^{3+}+OH^-+OH.$) has been demonstrated ([31]S. Wang, H. Li, S. Xie, S. Liu, L. Xu, *Chemosphere* 2006, 65, 82-87; [32]S. G. Huling, P. K. Jones, W. P. Ela, R. G. Arnold, *Water Research* 2005, 39, 2145-2153; [33]J. H. Ramirez, C. A. Costa, L. M. Madeira, *Catalysis Today* 2005, 107-108, 68-76; [34]K. Swaminathan, S. Sandhya, A. Carmalin Sophia, K. Pachhade, Y. V. Subrahmanyam, *Chemosphere* 2003, 50, 619-625). Similarly, the regeneration of mesoporous silica ($SiO_2$) via simple washing using the acid and alkaline solutions ([35]K. Y. Ho, G. McKay, K. L. Yeung, *Langmuir* 2003, 19, 3019-3024) has also been reported. The decomposition of organic synthetic-dye using the combination of $TiO_2/H_2O_2$/UV-radiation and $H_2O_2$/UV-radiation ($\lambda$=254 nm) has been shown ([36]M. F. Kabir, E. Visman, C. H. Langford, A. Kantzas, *Chemical Engineering Journal* 2006, 118, 207-212).

However, the following are the major draw-backs of the prior art:
1. Large amount of sludge is produced due to the adsorption of organic synthetic-dye, without its degradation, on the surface of nanotubes-based dye-adsorbent which causes the serious adsorbent disposal and recycling problems, typically under the dark-condition.
2. The maximum dye-adsorption capacity of the nanotubes-based dye-adsorbent is reduced for the next cycles of dye-adsorption due to the presence of previously adsorbed-dye on the surface, which reduces the effective specific surface-area available for the dye-adsorption.
3. The techniques for the removal of previously adsorbed-dye from the surface of nanotubes-based dye-adsorbent powder, typically under the dark-condition, are unknown.
4. The nanotubes-based dye-adsorbent is non-recyclable, specifically under the dark-condition.
5. The dye-decomposition using the nanotubes-based dye-adsorbent via photocatalytic dye-degradation mechanism under the radiation-exposure (UV, visible, fluorescent, solar, or heat), is limited and time-consuming due to both the poor crystallinity and the limited light-penetration into the volume of photocatalyst particle due to the presence of large amount of surface-adsorbed dye.
6. Any attempt to improve the crystallinity of nanotubes and decomposing adsorbed-dye via thermal treatments also destroys the nanotube-morphology.
7. The Fenton-driven oxidation for the regeneration of adsorbents is a costlier process due to the requirement of additional chemicals such as the metal-salts ($FeCl_3$ and $FeSO_4$).
8. The use of Fenton-driven oxidation for the regeneration of adsorbents may result in the contamination of adsorbents, typically the semiconductor-oxides nanotubes, due to the pick-up of $Fe^{2+}/Fe^{3+}$ cations via an ion-exchange mechanism.
9. For the voltage-induced dark-photocatalysis, conducted in the absence of any exposure to the external-radiation, the application of an external-voltage is essential to generate the electron-hole pairs, which makes the process energy-sensitive.

10. The voltage-Induced dark-photocatalysis process does not degrade an organic synthetic-dye in the dark-condition if the applied voltage is reduced below a threshold value and/or removed completely.
11. The voltage-induced dark-photocatalysis process cannot be used for the catalyst in the powder form.
12. The use of microwave and ultrasonicator as an external power-source increases the cost of dye-decomposition due to the associated power-consumption and maintenance; they also need more space for the experimentation and may not be suitable for the scale-up operation for commercialization.
13. The commercialization of the nanotubes-based dye-adsorbent is not possible due to the above major issues associated with its recyclability, specifically under the dark-condition.

Hence, the main objective of the present invention is to overcome the drawbacks associated with the prior art, as described above, by developing different innovative, efficient, and cost-effective methods for recycling the nanotubes-based dye-adsorbent by decomposing the organic synthetic-dyes under the dark-condition in an aqueous solution without the use of external power-source (potential difference, microwave, ultrasonicator, and other) to save the energy-consumption.

NOVELTY OF THE PRESENT INVENTION

1. It provides methods to adsorb and decompose an organic synthetic-dye on the surface of nanotubes-based dye-adsorbent.
2. It provides a method to remove the organic synthetic-dye from an aqueous solution, using the nanotubes-based dye-adsorbent powder, in which the dye-adsorption and dye-decomposition take place different aqueous solutions ("two-step" dye-removal method).
3. It provides a method to remove the organic synthetic-dye from an aqueous solution, using the nanotubes-based dye-adsorbent powder, in which the dye-adsorption and dye-decomposition take place in the same aqueous solution ("one-step" dye-removal method).
4. It provides methods to use the nanotubes-based dye-adsorbent powder, for the repeated cycles of dye-adsorption under the dark-condition, by decomposing the previously adsorbed-dye (surface-cleaning treatment) under the dark-condition, that is without an exposure to the external-radiation such as the UV, visible, fluorescent, solar, or heat to save the energy-consumption.
5. It provides methods to enhance the specific surface-area of the nanotubes-based dye-adsorbent powder after the initial cycles of dye-adsorption under the dark-condition.
6. It provides methods to regain the maximum dye-adsorption capacity of the nanotubes-based dye-adsorbent powder after the initial cycles of dye-adsorption under the dark-condition.
7. It provides methods to recycle the nanotubes-based dye-adsorbent powder, which are faster, efficient, and cost-effective than the conventional dye-removal methods.
8. It provides methods to decompose the organic synthetic-dye, in an aqueous solution under the dark-condition without the use of an external power-source, which are faster, efficient, easy-to-operate, and cost-effective than the conventional dye-decomposition methods.
9. It provides methods to decompose the organic synthetic-dye, in an aqueous solution under the dark-condition without the use of an external power-source, which can be operated in any part of the world (hot or cold) at any time (day or night).
10. It provides methods to use and recycle the nanotubes-based dye-adsorbent powder for the repeated dye-removal cycles, conducted under the dark-condition without the use of an external power-source to save the energy consumption, which makes its commercialization possible.

OBJECTIVES OF THE INVENTION

The main objective of the present invention is to provide, Methods for Decomposition of Organic Synthetic-Dyes using Semiconductor-Oxides Nanotubes via Dark-Catalysis, which obviates the major drawbacks of the hitherto known to the prior art as detailed above.

Yet another objective of the present invention is, to develop a "two-step" dye-removal method, using the nanotubes-based dye-adsorbent powder, involving the dye-adsorption in one aqueous solution and the dye-decomposition of the surface-adsorbed dye in another aqueous solution.

Yet another objective of the present invention is, to develop a "one-step" dye-removal method, using the nanotubes-based dye-adsorbent powder, involving the simultaneous dye-adsorption and dye-decomposition in the same aqueous solution under the dark-condition.

Yet another objective of the present invention is, to develop methods for decomposing the previously adsorbed-dye from the surface of nanotubes-based dye-adsorbent powder selected from the group consisting of $H_2Ti_3O_7$, anatase-$TiO_2$, or any other semiconductor material.

Yet another objective of the present invention is, to develop methods for decomposing the adsorbed-dye on the surface of nanotubes-based dye-adsorbent powder under the dark-condition without the use of any external power-source such as the applied potential-difference, microwave, ultrasonicator, and other to save the energy-consumption.

Yet another objective of the present invention is, to develop methods for regaining the original specific surface-area of the nanotubes-based dye-adsorbent powder after the initial cycles of dye-adsorption under the dark-condition.

Yet another objective of the present invention is, to develop methods without the use of any external power-source such as the applied potential-difference, microwave, ultrasonicator, and other for regaining the original dye-adsorption capacity of the nanotubes-based dye-adsorbent powder after the initial cycles of dye-adsorption under the dark-condition.

Yet another objective of the present invention is, to demonstrate the "two-step" and "one-step" dye-removal methods by monitoring the variation in the color of the nanotubes-based dye-adsorbent powder.

SUMMARY OF THE INVENTION

Accordingly, the present invention provides a process for decomposition of organic synthetic-dyes using semiconductor-oxides nanotubes via dark-catalysis which comprises the step of,
(i) suspending nanotubes-based dye-adsorbent powder in an aqueous solution of organic synthetic-dye,
(ii) adding a strong oxidizer in the above solution of step (i), stirring the suspension, under the dark-condition, using a magnetic or overhead stirrer for 10-3600 min for simultaneous dye-adsorption and dye-decomposition on the powder-surface;
(iii) optionally transferring the dye adsorbent powder treated with organic synthetic dye solution in step (i), to another aqueous solution containing a strong oxidizer and stirring the suspension, under the dark-condition, using a magnetic or overhead stirrer for 10-3600 min for the complete dye-decomposition on the powder-surface, (iii) separating the powder from the solution of step (ii) or step (iii) using a centrifuge operated at 2000-4000 rpm;

(iv) drying the powder in an oven at 70-90° C. for 15-20 h;

(v) recycling the dried-powder to repeat step-(i) to step-(iv) for the next cycle of dye-decomposition under the dark-condition In an embodiment the semiconductor-oxides nanotubes used in the invention is selected from $H_2Ti_3O_7$ or anatase-$TiO_2$.

In another embodiment of present invention the simultaneous adsorption and decomposition of synthetic dye as described in step (ii) of the process is designated as "one-step" method and decomposition of dye in a separate solution (bath) as described in step (ii) of the process is designated as "two-step" method.

In another embodiment of present invention the nanotubes of $H_2Ti_3O_7$ or anatase-$TiO_2$ are synthesized first via hydrothermal method and utilized for the removal of an organic synthetic-dye from an aqueous solution via surface-adsorption mechanism under the dark-condition. In the "two-step" dye-removal method, the nanotubes-based dye-adsorbent powder is used for the number of successive dye-adsorption cycles, under the dark-condition, to enable the adsorption of large quantity of organic synthetic-dye on the surface. As a result, the nanotubes-based dye-adsorbent powder with the surface-adsorbed dye exhibits reduced specific surface-area and dye-adsorption capacity for the next cycles of dye-adsorption under the dark-condition. In order to completely decompose the previously adsorbed organic synthetic-dye from the powder-surface, and to regain its very high specific surface-area and maximum dye-adsorption capacity, the nanotubes-based dye-adsorbent powder with the surface-adsorbed organic synthetic-dye is stirred in another aqueous solution containing a strong oxidizer (surface-cleaning treatment), such as hydrogen peroxide ($H_2O_2$), calcium hypochlorite, sodium hypochlorite, potassium permanganate, or any material producing —OH. in an aqueous solution, either under the radiation-exposure (UV, visible, fluorescent, solar, or heat) or under the dark-condition to save the energy-consumption. The obtained powder with a cleaned-surface can be reused as a dye-adsorbent catalyst for the next-cycles of dye-adsorption under the dark-condition. In order to reduce the number of steps involved the dye-removal process, the dye-adsorption and the dye-decomposition are combined in the same solution (termed here as "one-step" dye-removal process). In this, the nanotubes-based dye-adsorbent powder is stirred in an aqueous solution of the organic synthetic-dye containing a strong oxidizer under the dark-condition. The dye-adsorbent powder is then re-used as a catalyst for the next-cycles of simultaneous dye-adsorption and dye-decomposition under the dark-condition.

In another embodiment of the present invention, the organic synthetic-dye is surface-adsorbed from an aqueous solution, under the dark-condition, using the nanotubes of $H_2Ti_3O_7$ and the surface-adsorbed dye is decomposed in another aqueous solution, containing a strong oxidizer, Without the use of any external power-source such as the applied potential-difference, microwave, ultrasonicator, and other ("two-step" dye-removal process).

In another embodiment of the present invention, the organic synthetic-dye is surface-adsorbed from an aqueous solution using the nanotubes of $H_2Ti_3O_7$ under the dark-condition and the surface-adsorbed dye is decomposed in another aqueous solution, containing a strong oxidizer, under the sunlight-exposure ("two-step" dye-removal process).

In another embodiment of the present invention, the organic synthetic-dye is surface-adsorbed from an aqueous solution using the nanotubes of $H_2Ti_3O_7$ under the dark-condition and the surface-adsorbed dye is decomposed in another aqueous solution, containing a strong oxidizer, under the dark-condition without the use of any external power-source such as the applied potential-difference, microwave, ultrasonicator, and other ("two-step" dye-removal process).

In another embodiment of the present invention, the variation in the color of the $H_2Ti_3O_7$ nanotubes is monitored after the dye-adsorption and dye-decomposition steps conducted under the dark-condition without the use of any external power-source such as the applied potential-difference, microwave, ultrasonicator, and other ("two-step" dye-removal process).

In another embodiment of the present invention, the organic synthetic-dye is simultaneously surface-adsorbed and decomposed in an aqueous solution, containing a strong oxidizer and the nanotubes of $H_2Ti_3O_7$, under the dark-condition without the use of any external power-source such as the applied potential-difference, microwave, ultrasonicator, and other ("one-step" dye-removal process).

In another embodiment of the present invention, the variation in the color of the $H_2Ti_3O_7$ nanotubes is monitored after the simultaneous dye-adsorption and dye-decomposition steps conducted in an aqueous solution, containing a strong oxidizer, under the dark-condition without the use of any external power-source such as the applied potential-difference, microwave, ultrasonicator, and other ("one-step" dye-removal process).

In another embodiment of the present invention, the organic synthetic-dye is surface-adsorbed from an aqueous solution, under the dark-condition, using the nanotubes of anatase-$TiO_2$ and the surface-adsorbed dye is decomposed in another aqueous solution, containing a strong oxidizer, under the dark-condition without the use of any external power-source such as the applied potential-difference, microwave, ultrasonicator, and other ("two-step" dye-removal process).

In another embodiment of the present invention, the variation in the color of the anatase-$TiO_2$ nanotubes is monitored after the dye-adsorption and dye-decomposition steps conducted under the dark-condition without the use of any external power-source such as the applied potential-difference, microwave, ultrasonicator, and other ("two-step" dye-removal process).

In another embodiment of the present invention, the organic synthetic-dye is simultaneously surface-adsorbed and decomposed in an aqueous solution, containing a strong oxidizer and the nanotubes of anatase-$TiO_2$, under the dark-condition without the use of any external power-source such as the applied potential-difference, microwave, ultrasonicator, and other ("one-step" dye-removal process).

In another embodiment of the present invention, the variation in the color of the anatase-$TiO_2$ nanotubes is monitored after the simultaneous dye-adsorption and dye-decomposition steps conducted under the dark-condition without the use of any external power-source such as the applied potential-difference, microwave, ultrasonicator, and other ("one-step" dye-removal process).

BRIEF DESCRIPTION OF DRAWINGS

The present invention is illustrated in FIGS. 1 to 16 of the drawing(s) accompanying this specification. In the drawings like reference numbers/letters indicate corresponding parts in the various figures.

In FIG. 5A, (i) and (ii) represent an exposure to the UV-radiation and sunlight during the surface-cleaning treatment; while in FIG. 5B, the surface-cleaning treatment is conducted under the dark-condition.

In FIG. 13A, (i) and (ii) represent an exposure to the UV-radiation and sunlight during the surface-cleaning treatment; while in FIG. 13B, the surface-cleaning treatment is conducted under the dark-condition.

For (ii) and (iii), the "one-step" method is conducted without and with the addition of nanotubes.

Figure 18:
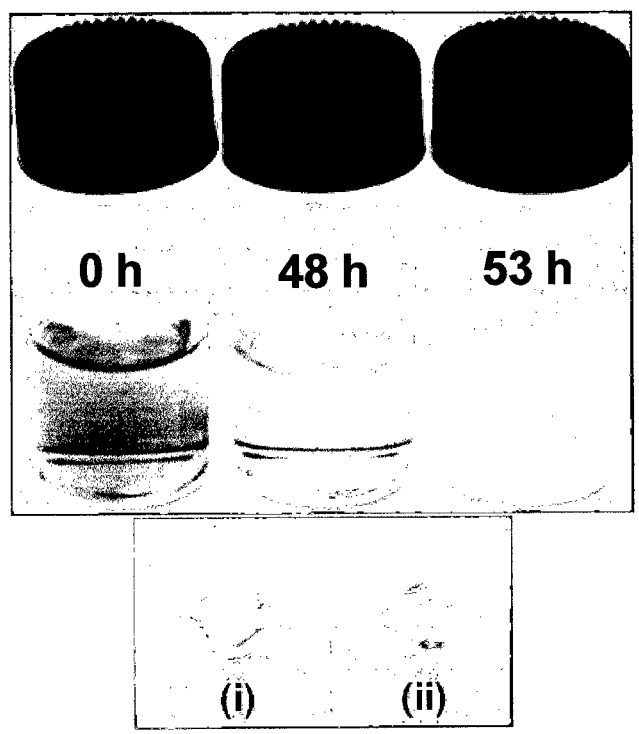

FIG. 18 represents the effect of "one-step" dye-removal process, conducted in the dark-condition, on variation in the color of textile-effluent sample containing a Direct Dye Blue 5GLL after different contact time. (i) and (ii) show the hydrogen titanate nanotubes at the start and after the contact time of 48 h.

Figure 19:
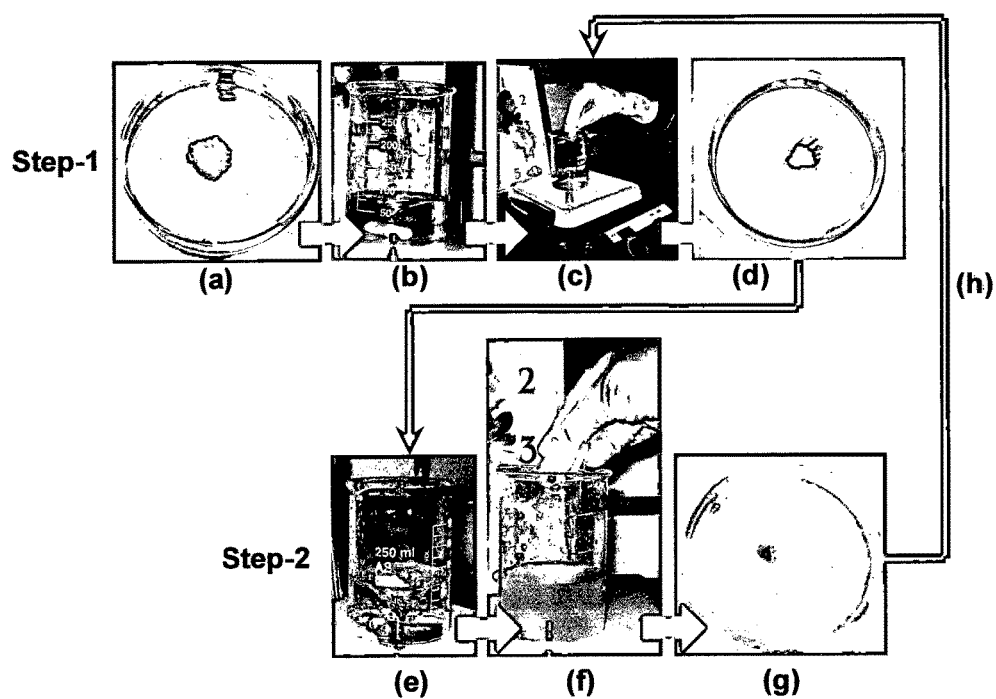

FIG. 19 represents the "two-step" dye-removal process, conducted under the dark-condition, using the hydrothermally processed nanotubes of $H_2Ti_3O_7$ or anatase-$TiO_2$. The step-1 shows the hydrothermally processed nanotubes of $H_2Ti_3O_7$ or anatase-$TiO_2$ (a), the MB dye solution (b), the addition of nanotubes of $H_2Ti_3O_7$ or anatase-$TiO_2$ in the MB dye solution (c), and the nanotubes of $H_2Ti_3O_7$ or anatase-$TiO_2$ with the surface-adsorbed MB dye (d). The step-2 shows an aqueous $H_2O_2$ solution (e), the addition of nanotubes of $H_2Ti_3O_7$ or anatase-$TiO_2$ with the surface-adsorbed MB dye (followed by stirring under the dark-condition) (f), and the recovered and dried catalyst-powder (g) which is recycled (h) for the next-cycle of dye-adsorption conducted under the dark-condition.

Figure 20:
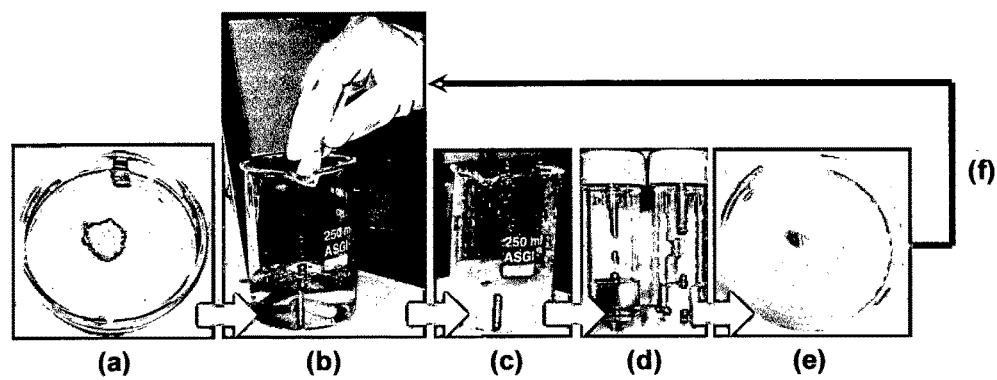

FIG. 20 represents the "one-step" dye-removal process, conducted under the dark-condition, which shows the hydrothermally processed nanotubes of $H_2Ti_3O_7$ or anatase-$TiO_2$ (a), the addition of nanotubes of $H_2Ti_3O_7$ or anatase-$TiO_2$ in the MB dye solution containing $H_2O_2$ (b), stirring the resulting suspension under the dark-condition (c), the samples of initial dye-solution and final clear aqueous solution (d), the recovered and dried catalyst-powder (e) which is recycled (f) for the next-cycle of simultaneous dye-adsorption/dye-decomposition conducted under the dark-condition.

FIG. 21 represent a comparison of net dye-removal rates ($mg \cdot g^{-1} \cdot h^{-1}$), including dye-adsorption and dye-decomposition, under different conditions (Note: The net dye-removal rates provided here are only for the data provided in the examples and do not restrict the scope of invention).

DETAILED DESCRIPTION OF THE INVENTION

The present invention provides a process for Decomposition of Organic Synthetic-Dyes using Semiconductor-Oxides Nanotubes via Dark-Catalysis which comprises processing the nanotubes of $H_2Ti_3O_7$ and anatase-$TiO_2$ via conventional hydrothermal method; 3 g of nanocrystalline anatase-$TiO_2$ is suspended in an aqueous solution containing 10 M sodium hydroxide (NaOH) filled up to 84 vol. % of teflon-beaker placed in 200 ml capacity stainless steel-vessel of an autoclave maintained at 120° C. for 30 h under an autogenous pressure; the hydrothermal product is separated from the top solution and washed using 100 ml of 1 M HCl for 1 h and 100 ml of pure distilled-water for 1 h; the product is again washed using 100 ml of 1 M HCl for 1 h and then multiple times (#8-9) using 100 ml of pure distilled-water till the solution-pH remains neutral (~5-7); the product obtained after the washing treatment is the nanotubes of $H_2Ti_3O_7$; the anatase-$TiO_2$ nanotubes are obtained by heating the nanotubes of $H_2Ti_3O_7$ at 400° C. for 1 h; the nanotubes of $H_2Ti_3O_7$ (0.1-3.0 $g \cdot L^{-1}$) are then utilized for the removal of organic cationic-dye (MB; 5-100 $\mu mol \cdot L^{-1}$) from an aqueous solution (50-250 ml) via surface-adsorption mechanism under the dark-condition via "two-step" and "one-step" dye-removal methods; In a "two-step" dye-removal method, the dye-adsorption step under the dark-condition is repeated for several times to enable the adsorption of sufficient quantity of MB dye on the surface; the nanotubes of $H_2Ti_3O_7$ with the surface-adsorbed MB are separated from the aqueous solution using a centrifuge (R23, Remi Instruments India Ltd.) operated at 2000-4000 rpm; in order to completely decompose the previously adsorbed MB dye from the surface, the nanotubes of $H_2Ti_3O_7$ are transferred to 50-250 ml aqueous solution containing a strong oxidizer such as $H_2O_2$ (0.5-10 M), calcium hypochlorite, sodium hypochlorite, potassium permanganate, or any material producing —OH. in an aqueous solution (surface-cleaning treatment); the suspension is stirred either under the radiation-exposure (UV and sunlight) or under the dark-condition (to save the energy-consumption) using a magnetic or overhead stirrer for 1-10 h; the nanotubes-based dye-adsorbent powder is separated from the aqueous solution using a centrifuge operated at 2000-4000 rpm and dried in an oven at 70-90° C. for 15-20 h; the surface-cleaned nanotubes of $H_2Ti_3O_7$ are reused for the next cycles of dye-adsorption under the dark-condition; change in the original white-color of $H_2Ti_3O_7$ nanotubes is monitored before and after the surface-cleaning treatment; the above method of using and recycling the nanotubes of $H_2Ti_3O_7$, in which the dye-adsorption and dye-decomposition take place in different aqueous solutions, is termed here as a "two-step" dye-removal method; in a "one-step" dye-removal method, the nanotubes of $H_2Ti_3O_7$ are stirred in 50-250 ml of an aqueous solution containing 5-100 $\mu mol \cdot L^{-1}$ MB dye and a strong oxidizer such as $H_2O_2$ (0.5-10 M), calcium hypochlorite, sodium hypochlorite, potassium permanganate, or any material producing —OH. in an aqueous solution; the suspension is stirred under the radiation-exposure (UV and sunlight) or under the dark-condition (to save the energy-consumption) for 10-60 min; the nanotubes of $H_2Ti_3O_7$ are separated from the solution using a centrifuge operated at 2000-4000 rpm, dried in an oven at 70-90° C. for 15-20 h, and then reused for the next cycle involving the simultaneous dye-adsorption and dye-decomposition under the dark-condition; the change in the original color of the $H_2Ti_3O_7$ nanotubes is monitored after each cycle of simultaneous dye-adsorption and dye-decomposition; the "two-step" and "one-step" dye-removal methods are also repeated using the nanotubes of anatase-$TiO_2$; the nanotubes of $H_2Ti_3O_7$ and anatase-$TiO_2$ are characterized using the transmission electron microscope (TEM, Tecnai $G^2$, FEI, The Netherlands) and X-ray diffraction (XRD, PW1710, Phillips, The Netherlands) for analyzing the product morphology and structure; the dye-adsorption measurements under the dark-condition are conducted using the MB as a model catalytic dye-agent; 50-250 ml aqueous suspension is prepared by dissolving 5-100 $\mu mol \cdot L^{-1}$ of MB dye and dispersing 0.1-3.0 $g \cdot L^{-1}$ of the dye-adsorbent powder in pure distilled water; the suspension is stirred under the dark-condition and 3 ml sample suspension is separated after each 5-60 min time interval for total 30-240 min. The dye-adsorbent powder is separated using a centrifuge operated at 2000-4000 rpm and the solution is used to obtain the absorption spectra using the UV-visible absorption spectrometer (UV-2401 PC, Shimadzu, Japan); the normalized concentration of surface-adsorbed MB is calculated using Eq. 1, $$\% MB_{absorbed} = \left(\frac{C_0 - C_t}{C_0}\right)_{MB} \times 100 \qquad (1)$$

equivalent of the form, $$\% MB_{absorbed} = \left(\frac{A_0 - A_t}{A_0}\right)_{MB} \times 100 \tag{2}$$

where, $C_0$ and $C_t$ correspond to the MB dye concentration at the start and after contact time 't' with the corresponding absorbance of $A_0$ and $A_t$. For the "one-step" dye-removal method, the calculated amount is the amount of MB decomposed instead of the amount of MB adsorbed.

Example-1

Figure 1A:
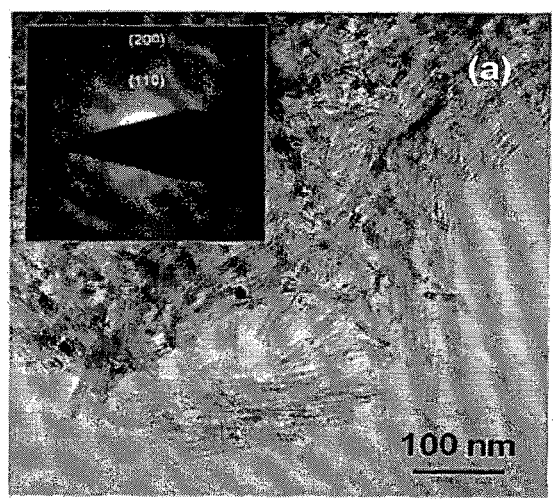
FIG. 1A represents a TEM image.
Figure 1B:
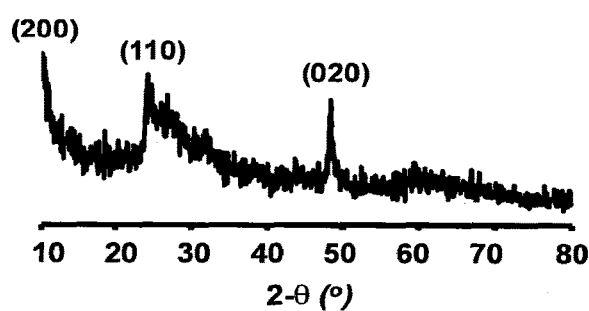
FIG. 1B represents a XRD pattern of the hydrothermal processed $H_2Ti_3O_7$ nanotubes having specific surface-area of 330 $m^2 \cdot g^{-1}$.

The TEM image and the corresponding XRD pattern of the hydrothermal product are presented in FIGS. 1(a) and 1(b). The product has nanotube morphology (internal diameter and wall-thickness: 4-6 nm and 2-3 nm). The XRD pattern is identified to be that of $H_2Ti_3O_7$. Thus, the nanotubes of $H_2Ti_3O_7$ are successfully processed via conventional hydrothermal method.

Figure 2A:
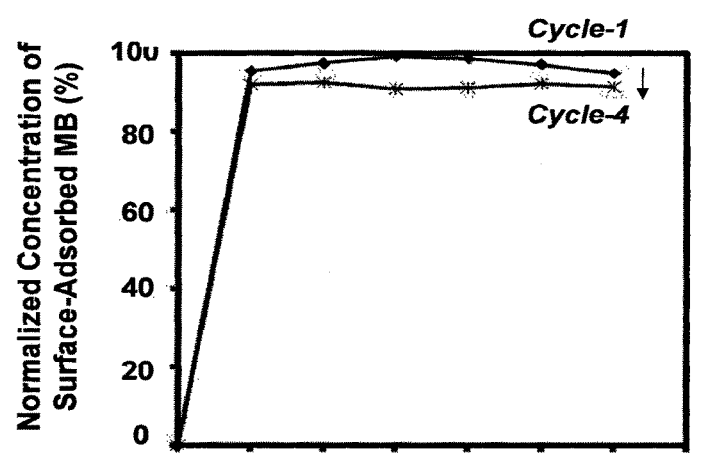
FIG. 2A represents a variation in the normalized concentration of surface-adsorbed methylene blue (MB, >96%, S.D. Fine Chemicals, India) dye as a function of contact time, obtained using the $H_2Ti_3O_7$ nanotubes, for different dye-adsorption cycles under the dark-condition.
Figure 2B:
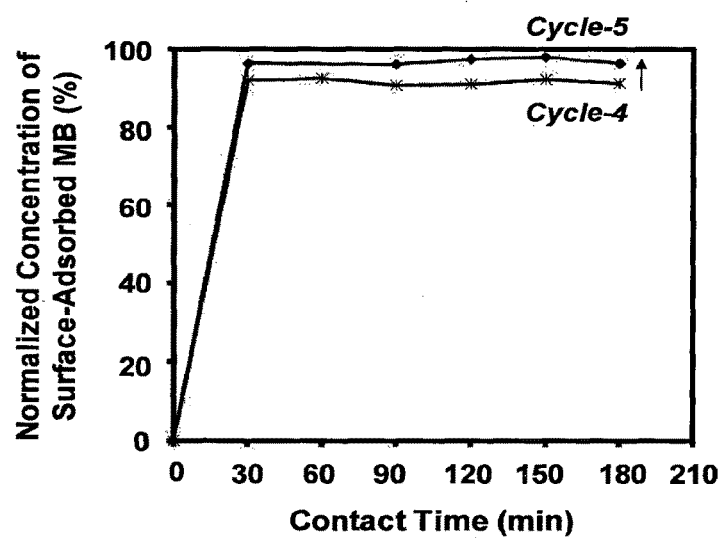
In FIG. 2B, cycle-5 is obtained after subjecting the $H_2Ti_3O_7$ nanotubes with the surface-adsorbed MB to the surface-cleaning treatment under the UV-radiation exposure for 8 h ("two-step" dye-removal method).

The $H_2Ti_3O_7$ nanotubes (0.4 g·L$^{-1}$) are utilized for the removal of MB dye (7.5 μmol·L$^{-1}$) from an aqueous solution (75 ml), under the dark-condition, via surface-adsorption mechanism using the "two-step" dye-removal method involving the surface-cleaning treatment under an exposure to the UV-radiation (Note: The dark-condition is created by enclosing the beaker with aluminum foil from all sides and placing it in a closed chamber with all lights shut-off). The obtained variation in the normalized surface-adsorbed MB dye concentration as a function of contact time in the dark is presented in FIG. 2(a) for different cycles. It is observed that, in the cycle-1, ~100% MB adsorption is reached in 90 min. The powder is filtered using a centrifuge (3500 rpm) and dried in an oven at 90° C. for 15 h before conducting the next cycle of dye-adsorption. After the cycle-4, the MB dye adsorption is observed to decrease to ~93% and total 22 mg·g$^{-1}$ of MB dye is adsorbed on the surface of $H_2Ti_3O_7$ nanotubes. In order to remove the previously adsorbed MB dye from the surface, the dye-adsorbent powder is subjected to the surface-cleaning treatment. The dried powder is stirred continuously for 8 h in 100 ml of 1 M $H_2O_2$ solution under the UV-radiation exposure in a Rayonet reactor containing 15 W tubes (Philips G15 T8) as the UV-source which emitted the UV-radiation with the wavelength within the range of 200-400 nm peaking at 360 nm. The powder is filtered using a centrifuge (3500 rpm) and dried in an oven at 90° C. for 15 h. The dried powder is then reused for the next cycle of dye-adsorption (cycle-5) as shown in FIG. 2(b). It is seen that, the surface-cleaned dye-adsorbent powder exhibits ~98% of dye-adsorption under the dark-condition. Thus, the original high dye-adsorption capacity is successfully restored in a "two-step" dye-removal method involving the dye-adsorption, under the dark-condition, in one aqueous solution and the dye-decomposition, under the UV-radiation exposure, in another aqueous solution. The net dye-removal rate including the dye-adsorption in dark and dye-decomposition under the UV-radiation is estimated to be 1.8 mg·g$^{-1}$·h$^{-1}$.

Figure 3A:
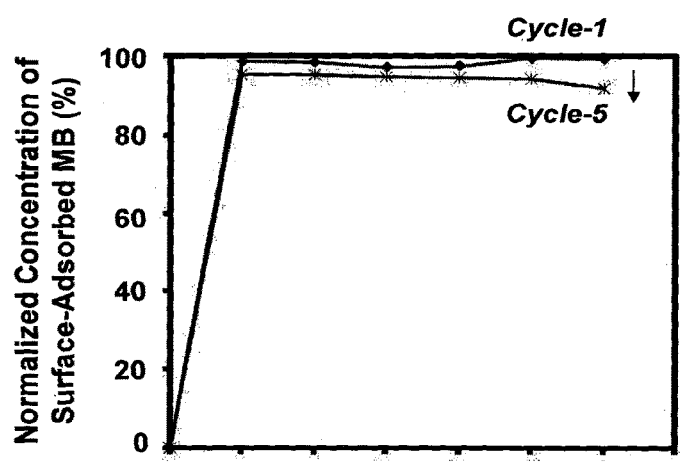
FIG. 3A represents variation in the normalized concentration of surface-adsorbed MB as a function of contact time, obtained using the $H_2Ti_3O_7$ nanotubes, for different dye-adsorption cycles under the dark-condition.
Figure 3B:
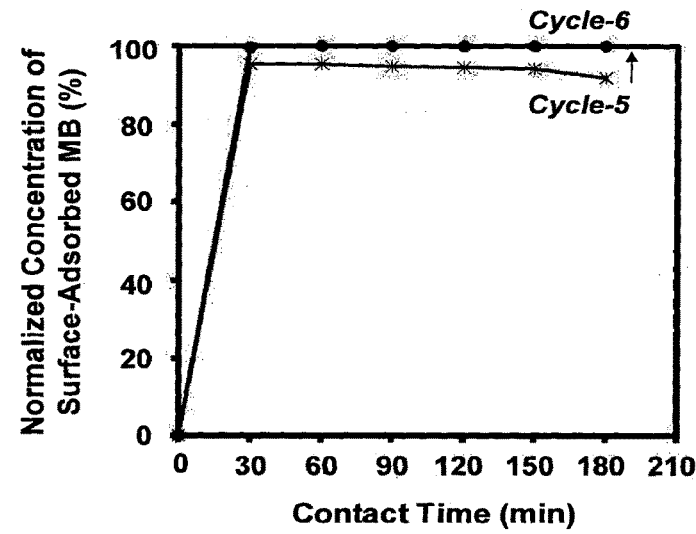
In FIG. 3B, cycle-6 is obtained after subjecting the $H_2Ti_3O_7$ nanotubes with the surface-adsorbed MB to the surface-cleaning treatment under the sunlight for 8 h ("two-step" dye-removal method).

In another set of experiments, the $H_2Ti_3O_7$ nanotubes (0.4 g·L$^{-1}$) are utilized for the removal of MB dye (7.5 μmol·L$^{-1}$) from an aqueous solution (75 ml), under the dark-condition, via surface-adsorption mechanism using the "two-step" dye-removal method involving the surface-cleaning treatment under an exposure to the sunlight. The obtained variation in the normalized surface-adsorbed MB dye concentration as a function of contact time in the dark is presented in FIG. 3(a) for different cycles. It is observed that, in the cycle-1, ~100% MB adsorption is reached in 30 min. The powder is filtered using a centrifuge (3500 rpm) and dried in an oven at 90° C. for 15 h before the next cycle of dye-adsorption. After cycle-5, the MB dye adsorption decreases to ~95% and total 29 mg·g$^{-1}$ of MB dye is adsorbed on the surface of $H_2Ti_3O_7$ nanotubes. In order to remove the previously adsorbed MB dye from the surface, the dye-adsorbent powder is subjected to the surface-cleaning treatment. The dried powder is stirred continuously for 8 h under the sunlight in 100 ml of 1 M $H_2O_2$ solution as a strong oxidizer. The powder is filtered using a centrifuge (3500 rpm) and dried in an oven at 90° C. for 15 h. The dried-powder is then used for the next cycle of dye-adsorption (cycle-6), under the dark-condition, as shown in FIG. 3(b). It is observed that, the surface-cleaned dye-adsorbent powder exhibits ~100% of dye-adsorption in 30 min. Thus, the original high dye-adsorption capacity is successfully restored in a "two-step" dye-removal method involving the dye-adsorption, under the dark-condition, in one aqueous solution and dye-decomposition, under the sunlight, in another aqueous solution. The net dye-removal rate including the dye-adsorption in dark and dye-decomposition under the sunlight is estimated to be 2.2 mg·g$^{-1}$·h$^{-1}$.

Figures 4A, 4B:
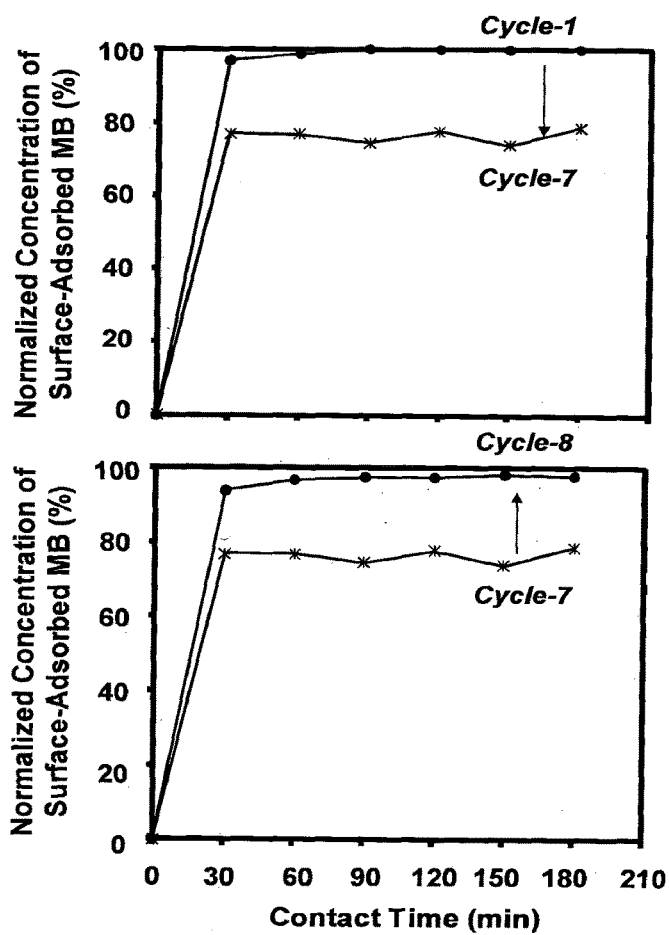
FIG. 4A represents variation in the normalized concentration of surface-adsorbed MB as a function of contact time, obtained using the $H_2Ti_3O_7$ nanotubes, for different dye-adsorption cycles under the dark-condition.
In FIG. 4B, cycle-8 is obtained after subjecting the $H_2Ti_3O_7$ nanotubes with the surface-adsorbed MB to the surface-cleaning treatment under the dark-condition for 8 h ("two-step" dye-removal method).

In another set of experiments, the $H_2Ti_3O_7$ nanotubes (0.4 g·L$^{-1}$) are utilized for the removal of MB dye (7.5 μmol·L$^{-1}$) from an aqueous solution (75 ml), under the dark-condition, via surface-adsorption mechanism using the "two-step" dye-removal method involving the surface-cleaning treatment under the dark-condition. The obtained variation in the normalized surface-adsorbed MB dye concentration as a function of contact time in the dark is presented in FIG. 4(a) for different cycles. It is observed that, in the cycle-1, ~100% MB adsorption is reached in 90 min. The powder is filtered using a centrifuge (3500 rpm) and dried in an oven at 90° C. for 15 h before the next cycle of dye-adsorption. After cycle-7, the MB dye adsorption is observed to be reduced to ~80% and total 33 mg·g$^{-1}$ of MB dye is adsorbed on the surface of $H_2Ti_3O_7$ nanotubes. In order to remove the previously adsorbed MB dye from the surface, the dye-adsorbent powder is subjected to the surface-cleaning treatment. The dried powder is stirred continuously for 8 h under the dark-condition in 100 ml of 1 M $H_2O_2$ solution as a strong oxidizer. The powder is filtered using a centrifuge (3500 rpm) and dried in an oven at 90° C. for 15 h. The dried powder is then used for the next cycle of dye-adsorption (cycle-8) as shown in FIG. 3(b). It is seen that, the surface-cleaned dye-adsorbent powder exhibits ~98% of dye-adsorption in 150 min. Thus, the original high dye-adsorption capacity is successfully restored in a "two-step" dye-removal method involving the dye-adsorption, under the dark-condition, in one aqueous solution and dye-decomposition, also under the dark-condition, in another aqueous solution. The net dye-removal rate including the dye-adsorption in dark and dye-decomposition also in dark is estimated to be 2.2 mg·g$^{-1}$·h$^{-1}$. The comparison shows that the net dye-removal rate using the surface-cleaning treatment under the dark-condition is comparable with that using the surface-cleaning treatment under the UV-radiation and sunlight.

Figure 5A:
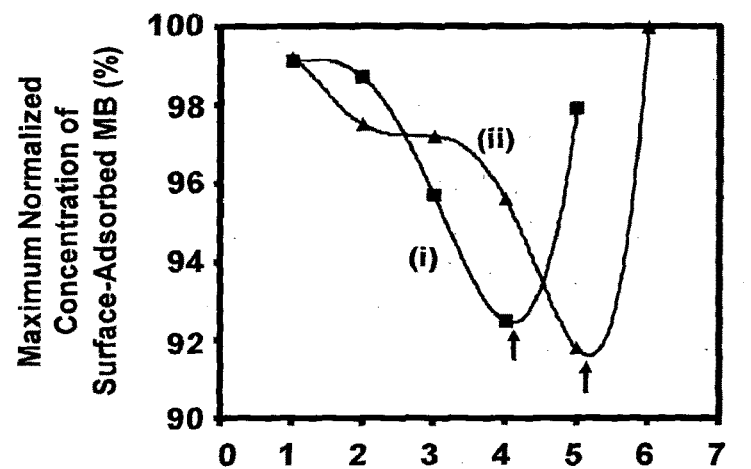
FIGS. 5A-B represent variations in the maximum normalized concentration of surface-adsorbed MB as a function of number of dye-adsorption cycle, under the dark-condition, obtained using the $H_2Ti_3O_7$ nanotubes. The arrows indicate the cycle-number after which the dye-adsorbent powder is subjected to the surface-cleaning treatment ("two-step" dye-removal method).
Figure 5B:
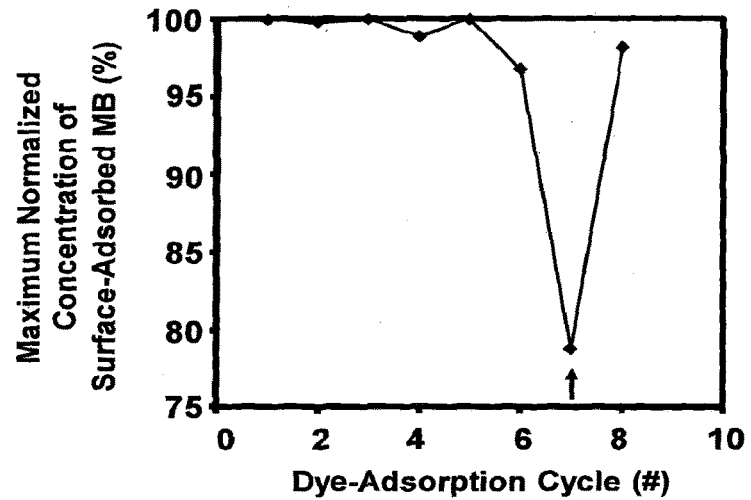

The effect of surface-cleaning treatment under different conditions, in a "two-step" dye-removal method, on the dye-adsorption behavior of $H_2Ti_3O_7$ nanotubes, is shown in FIG. 5. In all the cases, the dye-adsorption capacity is seen to decrease with increasing number of dye-adsorption cycles under the dark-condition. However, the surface-cleaning treatment (as indicated by arrows) under the UV-radiation and sunlight, FIG. 5(a), as well as under the dark-condition, FIG. 5(b), is effective in restoring the original high dye-adsorption capacity.

Figures 6A, 6B, 6C:
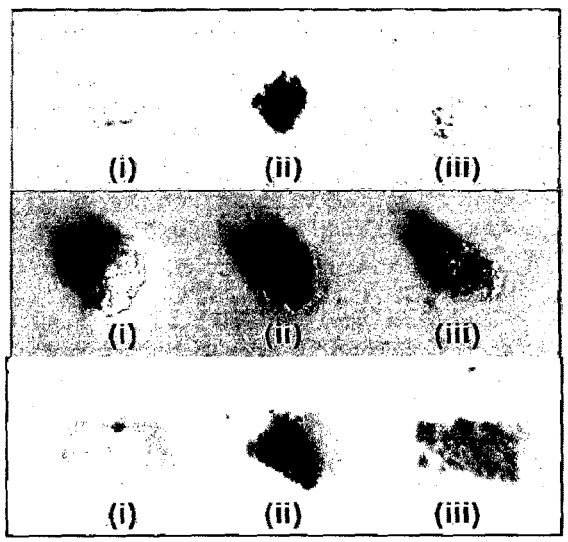
FIGS. 6A-C represent variationS in the color of $H_2Ti_3O_7$ nanotubes powder under different conditions—(i) pure (as-synthesized); (ii) with the surface-adsorbed MB (obtained after the cycle-number as marked by arrows in FIGS. 5A-B); and (iii) after subjecting the dye-adsorbent powder to the surface-cleaning treatment which is conducted under an exposure to the UV-radiation in FIG. 6A, sunlight in FIG. 6B, and under the dark-condition in FIG. 6C ("two-step" dye-removal method).

The variation in the original white-color of the $H_2Ti_3O_7$ nanotubes dye-adsorbent powder, before and after the surface-cleaning treatment of a "two-step" dye-removal method, under different conditions, is presented in FIG. 6. It is seen that, the MB dye-adsorption on the surface of nanotubes results in its color-change to blue. However, after the surface-cleaning treatment under different conditions (exposure to UV and sunlight as well as dark-condition), due to the decomposition of surface-adsorbed MB, further change in the powder-color to pale-yellow is observed. The dye-adsorbent powder with pale-yellow color has almost the same capacity for the maximum dye-adsorption, under the dark-condition, as that of the original dye-adsorbent powder (white-color).

Example-2

Figure 7A:
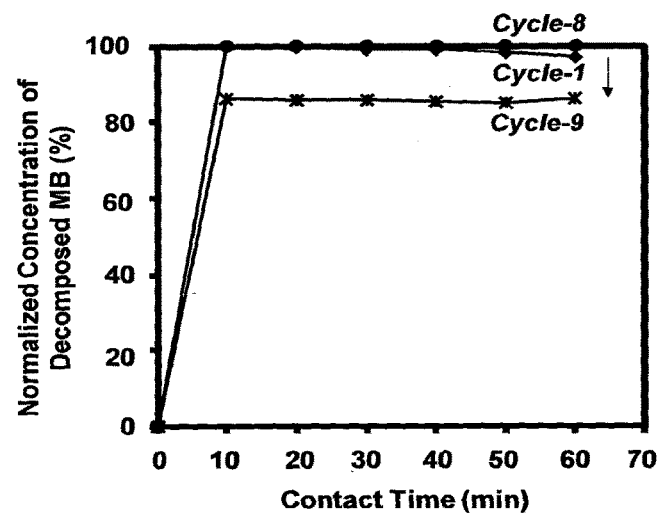
FIG. 7A represents a variation in the normalized concentration of decomposed MB as a function of contact time, obtained using the $H_2Ti_3O_7$ nanotubes, under the dark-condition ("one-step" dye-removal method)
Figure 7B:
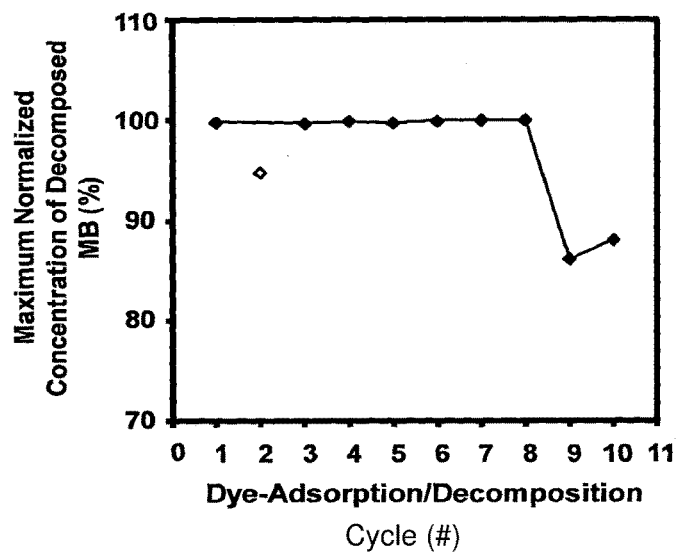
FIG. 7B is a variation in the maximum normalized concentration of decomposed MB as a function of number of cycles involving simultaneous dye-adsorption and dye-decomposition, obtained using the $H_2Ti_3O_7$ nanotubes, under the dark-condition ("one-step" dye-removal method).

In another set of experiments, the $H_2Ti_3O_7$ nanotubes (0.4 g·L$^{-1}$) are utilized for the removal of MB dye (7.5 µmol·L$^{-1}$), under the dark-condition, from 1 M $H_2O_2$ solution (75 ml) via simultaneous dye-adsorption and dye-decomposition using a "one-step" dye-removal method. The obtained variation in the normalized decomposed MB dye concentration as a function of contact time in the dark, for different cycles, is presented in FIG. 7(a). The variation in the maximum normalized decomposed MB dye concentration as a function of number of dye-adsorption/decomposition cycle is presented in FIG. 7(b). It is observed that, in the cycle-1, ~100% MB decomposition is reached in 10 min, which is retained for 8 successive cycles of simultaneous dye-adsorption and dye-decomposition conducted under the dark-condition. After every cycle, the powder is filtered using a centrifuge (3500 rpm) and dried in an oven at 90° C. for 15 h. After cycle-10 (not shown in FIG. 7(a) for clarity), the MB dye adsorption/decomposition capacity is observed to be reduced to ~86%. At the end of cycle-10, total 58 mg·g$^{-1}$ of MB dye is simultaneously adsorbed and decomposed on the surface of $H_2Ti_3O_7$ nanotubes. The net dye-removal rate involving simultaneous dye-adsorption and dye-decomposition in the dark is estimated to be 17 mg·g$^{-1}$·h$^{-1}$. Hence, the comparison shows that under the dark-condition, the "one-step" dye-removal method is almost 7 times quicker than the "two-step" dye-removal method (FIG. 4 and example-1).

Figure 8:
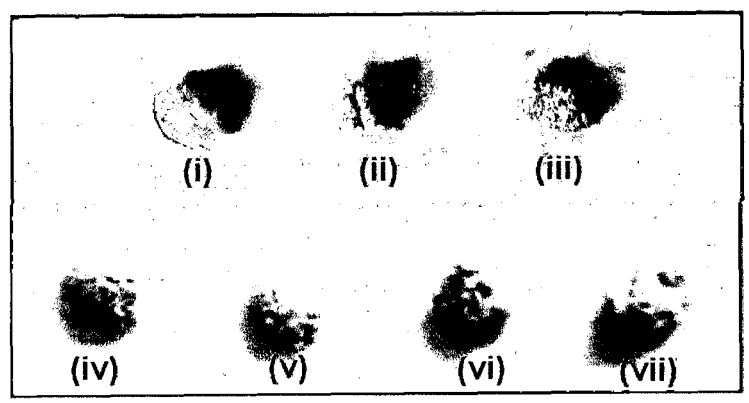
FIG. 8 variation in the color of $H_2Ti_3O_7$ nanotubes powder under different conditions—(i) pure (as-synthesized); (ii-vii) cycle-2 to cycle-7 involving simultaneous dye-adsorption and dye-decomposition under the dark-condition ("one-step" dye-removal method).

The variation in the original white-color of the $H_2Ti_3O_7$ nanotubes dye-adsorbent powder after each successive dye-adsorption/decomposition cycle in a "one-step" dye-removal method, under the dark-condition, is presented in FIG. 8. It is seen that, original white-color of the dye-adsorbent powder changes to pale-yellow after the cycle-1 and 2, which changes further to grayish-yellow for each successive cycle. The blue-color as observed in the "two-step" dye-removal method, FIG. 6, is not observed in the "one-step" dye-removal method due to the simultaneous dye-adsorption and dye-decomposition occurring in a single aqueous solution under the dark-condition.

Example-3

Figure 9A:
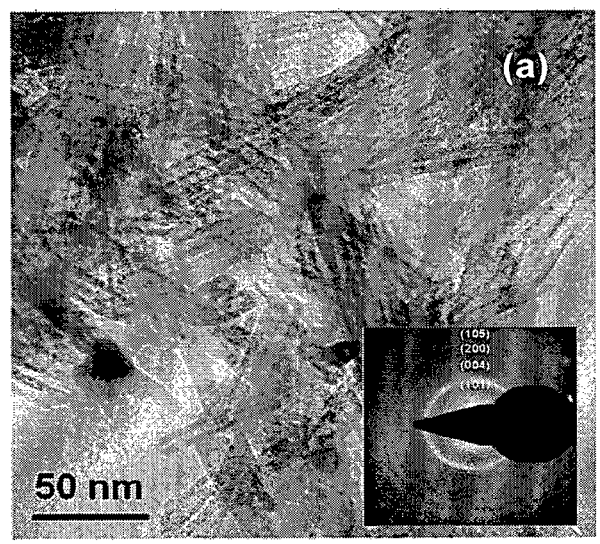
FIG. 9A represents a TEM image and FIG. 9B represents a XRD pattern of the hydrothermal processed anatase-$TiO_2$ nanotubes having specific surface-area of 180 $m^2 \cdot g^{-1}$.
Figure 9B:
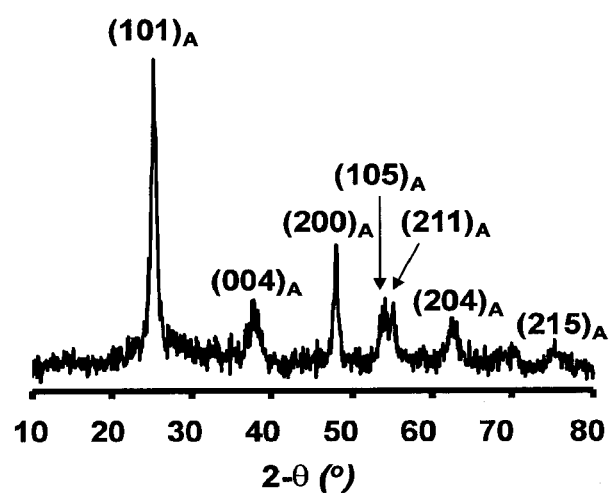

The TEM image and the corresponding XRD pattern of the hydrothermal product, obtained after the calcination at 400° C. for 1 h, are presented in FIGS. 9(a) and 9(b). The calcined product also has the nanotube morphology (internal diameter and wall-thickness: 3-5 nm and 1-3 nm); while, the XRD pattern has been indexed according anatase-$TiO_2$ (JCPDS card no. 21-1272). Thus, the anatase-$TiO_2$ nanotubes have been successfully processed using the conventional hydrothermal method.

Figure 10A:
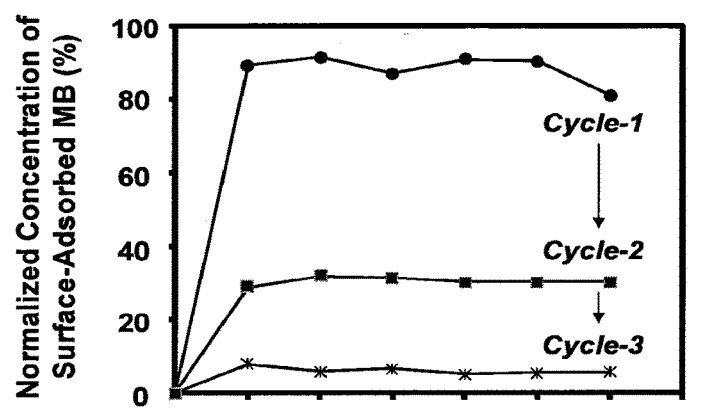
FIG. 10A represents a variation in the normalized concentration of surface-adsorbed MB as a function of contact time, obtained using the anatase-$TiO_2$ nanotubes, for different dye-adsorption cycles under the dark-condition.
Figure 10B:
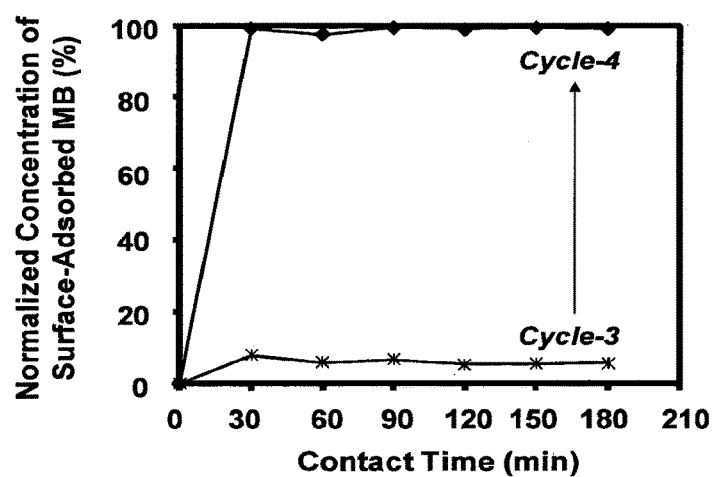
In FIG. 10B, cycle-4 is obtained after subjecting the anatase-$TiO_2$ nanotubes with the surface-adsorbed MB to the surface-cleaning treatment under the UV-radiation exposure for 8 h ("two-step" dye-removal method).

The anatase-$TiO_2$ nanotubes (0.4 g·L$^{-1}$) are utilized for the removal of MB dye (7.5 µmol·L$^{-1}$) from an aqueous solution (75 ml), under the dark-condition, via surface-adsorption mechanism using the "two-step" dye-removal method involving the surface-cleaning treatment under an exposure to the UV-radiation. The obtained variation in the normalized surface-adsorbed MB dye concentration as a function of contact time in the dark is presented in FIG. 10(a) for different cycles. It is observed that, in the cycle-1, ~91% MB adsorption is reached in 60 min. The powder is filtered using a centrifuge (3500 rpm) and dried in an oven at 90° C. for 15 h before the next cycle of dye-adsorption. After cycle-3, the MB dye adsorption decreases to ~8% and total 7 mg·g$^{-1}$ of MB dye is adsorbed on the surface of anatase-$TiO_2$ nanotubes. In order to remove the previously adsorbed MB dye from the surface, the dye-adsorbent powder is subjected to the surface-cleaning treatment. The dried powder is stirred continuously for 8 h in 100 ml of 1 M $H_2O_2$ solution, as a strong oxidizer, under the UV-radiation exposure in a Rayonet reactor. The powder is filtered using a centrifuge (3500 rpm) and dried in an oven at 90° C. for 15 h. The dried-powder is then used for the next cycle of dye-adsorption (cycle-4) as shown in FIG. 10(b). It is seen that, the surface-cleaned dye-adsorbent powder exhibits ~99% of dye-adsorption in 30 min. Thus, the original high dye-adsorption capacity is successfully restored in a "two-step" dye-removal method involving the dye-adsorption, under the dark-condition, in one aqueous solution and the dye-decomposition, under the UV-radiation exposure, in another aqueous solution. The net dye-removal rate including the dye-adsorption in dark and dye-decomposition under the UV-radiation is estimated to be 0.6 mg·g$^{-1}$·h$^{-1}$.

Figure 11A:
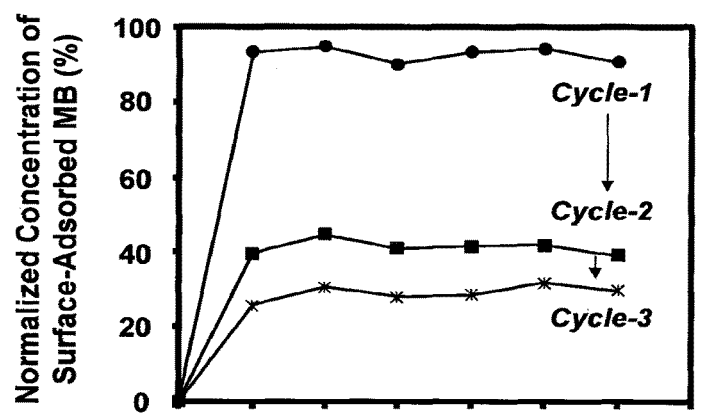
FIG. 11A represents a variation in the normalized concentration of surface-adsorbed MB as a function of contact time, obtained using the anatase-$TiO_2$ nanotubes, for different dye-adsorption cycles under the dark-condition.
Figure 11B:
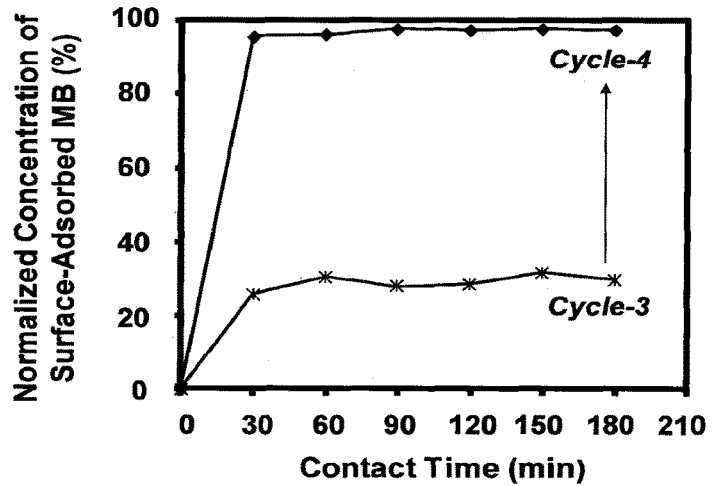
In FIG. 11B, cycle-4 is obtained after subjecting the anatase-$TiO_2$ nanotubes with the surface-adsorbed MB to the surface-cleaning treatment under the sunlight for 8 h ("two-step" dye-removal method).

In another set of experiments, the anatase-$TiO_2$ nanotubes (0.4 g·L$^{-1}$) are utilized for the removal of MB dye (7.5 µmol·L$^{-1}$) from an aqueous solution (75 ml), under the dark-condition, via surface-adsorption mechanism using the "two-step" dye-removal method involving the surface-cleaning treatment under an exposure to the sunlight. The obtained variation in the normalized surface-adsorbed MB dye concentration as a function of contact time in the dark, for different cycles, is presented in FIG. 11(a). It is observed that, in the cycle-1, ~95% MB dye-adsorption is reached in 60 min. The powder is filtered using a centrifuge (3500 rpm) and dried in an oven at 90° C. for 15 h before the next cycle of dye-adsorption. After cycle-3, the MB dye-adsorption is observed to be reduced to ~30% and total 9 mg·g$^{-1}$ of MB dye is adsorbed on the surface of anatase-$TiO_2$ nanotubes. In order to remove the previously adsorbed MB dye from the surface, the dye-adsorbent powder is subjected to the surface-cleaning treatment. The dried powder is stirred continuously for 8 h under the sunlight in 100 ml of 1 M $H_2O_2$ solution as a strong oxidizer. The powder is filtered using a centrifuge (3500 rpm) and dried in an oven at 90° C. overnight for 15 h. The dried powder is then used for the next cycle of dye-adsorption (cycle-4), under the dark-condition, as shown in FIG. 11(b). It is seen that, the surface-cleaned dye-adsorbent powder exhibits ~98% of dye-adsorption in 90 min. Thus, the original high dye-adsorption capacity is successfully restored in a "two-step" dye-removal method involving the dye-adsorption, under the dark-condition, in one aqueous solution and the dye-decomposition, under the sunlight, in another aqueous solution. The net dye-removal rate including the dye-adsorption in dark and dye-decomposition under the sunlight is estimated to be 0.8 mg·g$^{-1}$·h$^{-1}$.

Figure 12A:
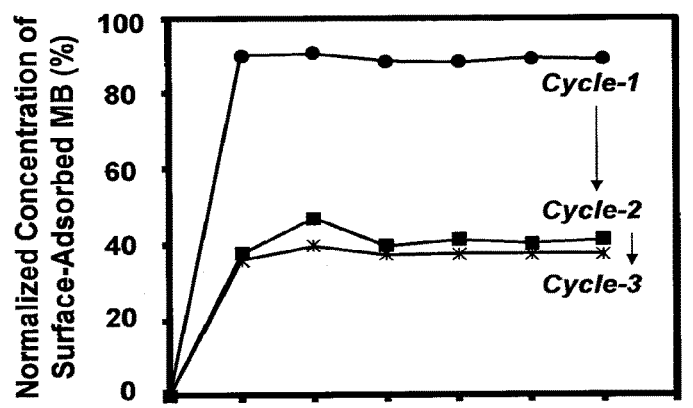
FIG. 12A represents a variation in the normalized concentration of surface-adsorbed MB as function of contact time, obtained using the anatase-$TiO_2$ nanotubes, for different dye-adsorption cycles under the dark-condition.
Figure 12B:
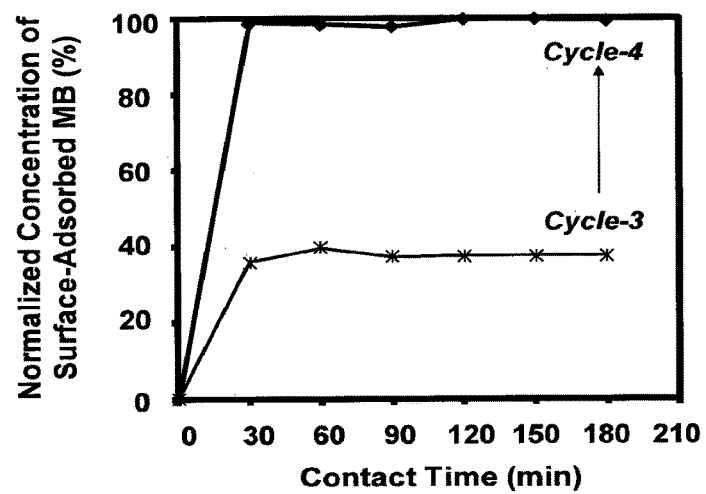
In FIG. 12B, cycle-4 is obtained after subjecting the anatase-$TiO_2$ nanotubes with the surface-adsorbed MB to the surface-cleaning treatment under the dark-condition for 8 h ("two-step" dye-removal method).

In another set of experiments, the anatase-TiO$_2$ nanotubes (0.4 g·L$^{-1}$) are utilized for the removal of MB dye (7.5 µmol·L$^{-1}$) from an aqueous solution (75 ml), under the dark-condition, via surface-adsorption mechanism using the "two-step" dye-removal method involving the surface-cleaning treatment also under the dark-condition. The obtained variation in the normalized surface-adsorbed MB dye concentration as a function of contact time in the dark, for different cycles, is presented in FIG. 12(a). It is observed that, in the cycle-1, ~90% MB dye-adsorption is reached in 30 min. The powder is filtered using a centrifuge (3500 rpm) and dried in an oven at 90° C. for 15 h before the next cycle of dye-adsorption. After cycle-3, the MB dye-adsorption decreases to ~40% and total 10 mg·g$^{-1}$ of MB dye is adsorbed on the surface of anatase-TiO$_2$ nanotubes. In order to remove the previously adsorbed MB dye from the surface, the dye-adsorbent powder is subjected to the surface-cleaning treatment. The dried powder is stirred continuously for 8 h under the dark-condition in 100 ml of 1 M H$_2$O$_2$ solution as a strong oxidizer. The powder is filtered using a centrifuge (3500 rpm) and dried in an oven at 90° C. for 15 h. The dried powder is then used for the next cycle of dye-adsorption (cycle-4), under the dark-condition, as shown in FIG. 12(b). It is observed that, the surface-cleaned dye-adsorbent powder exhibits ~99% of dye-adsorption in 30 min. Thus, the original high dye-adsorption capacity is successfully restored in a "two-step" dye-removal method involving the dye-adsorption, under the dark-condition, in one aqueous solution and the dye-decomposition, also under the dark-condition, in another aqueous solution. The net dye-removal rate including the dye-adsorption in dark and dye-decomposition also in dark is estimated to be 0.9 mg·g$^{-1}$·h$^{-1}$. The comparison shows that the net dye-removal rate using the surface-cleaning treatment under the dark-condition is comparable with that using the surface-cleaning treatment under the UV-radiation and sunlight.

Figure 13A:
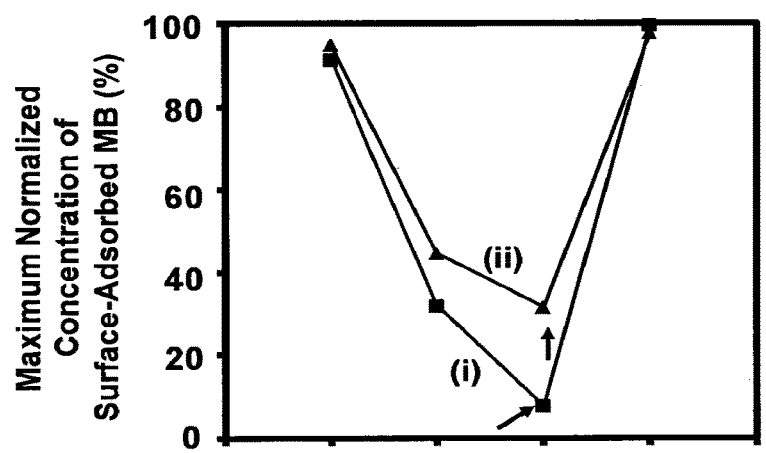
FIGS. 13A-B represent variations in the maximum normalized concentration of surface-adsorbed MB as a function of number of dye-adsorption cycle, obtained using the anatase-$TiO_2$ nanotubes, under the dark-condition. The arrows indicate the cycle-number after which the dye-adsorbent powder is subjected to the surface-cleaning treatment ("two-step" dye-removal method).
Figure 13B:
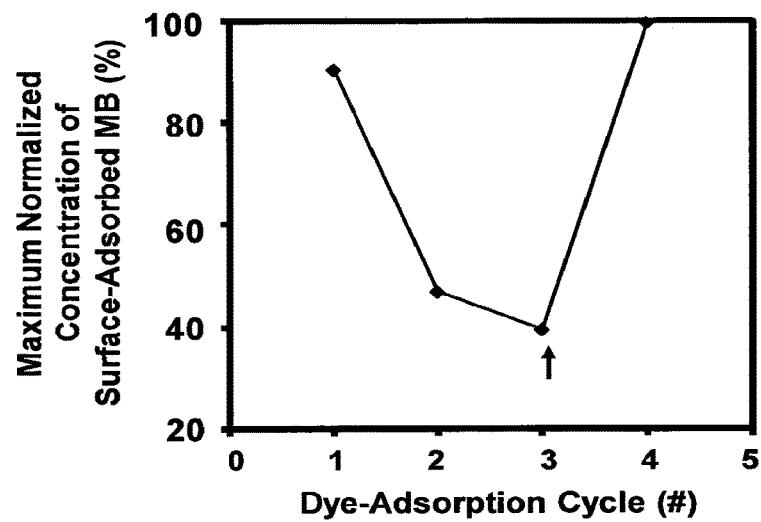

The effect of surface-cleaning treatment under different conditions, in a "two-step" dye-removal method, on the dye-adsorption behavior of anatase-TiO$_2$ nanotubes, is shown in FIG. 13. It is seen that, the dye-adsorption capacity decreases with increasing number of dye-adsorption cycle under the dark-condition. However, the surface-cleaning treatment (as indicated by arrows) under the UV-radiation and sunlight, FIG. 11(a), as well as under the dark-condition, FIG. 11(b), are effective in restoring the original high dye-adsorption capacity under the dark-condition.

Figures 14, 14A, 14B, 14C:
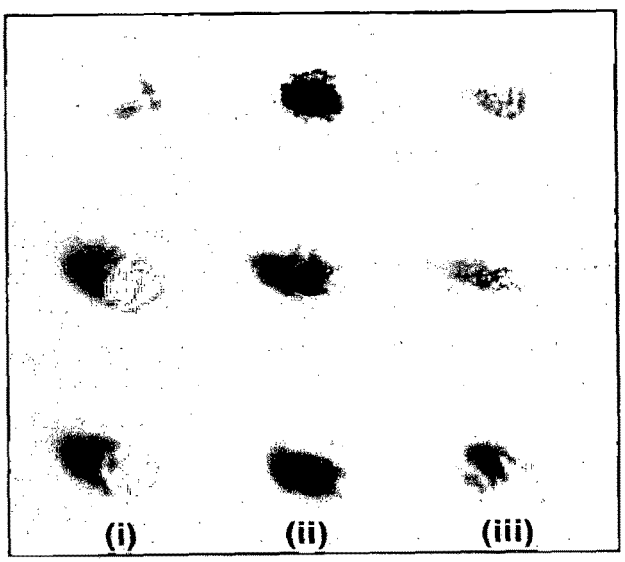
FIGS. 14A-C represent variations in the color of anatase-$TiO_2$ nanotubes powder under different conditions—(i) pure (as-synthesized); (ii) with the surface-adsorbed MB (obtained after the cycle-number as marked by the arrow in FIGS. 13A-B); and (iii) after subjecting the dye-adsorbent powder to the surface-cleaning treatment which is conducted under an exposure to the UV-radiation FIG. 14A, sunlight FIG. 14B, and under the dark-condition FIG. 14C ("two-step" dye-removal method).

The variation in the original white-color of the anatase-TiO$_2$ nanotubes dye-adsorbent powder before and after the surface-cleaning treatment under different conditions, in a "two-step" dye-removal method, is presented in FIG. 14. It is seen that, in all three conditions of the surface-cleaning treatment (UV and sunlight exposure as well as dark-condition), the MB dye-adsorption on the surface of anatase-TiO$_2$ nanotubes results in its color-change to blue. However, after the surface-cleaning treatment, due to the decomposition of the surface-adsorbed MB, further change in the powder-color to pale-yellow or grayish-yellow is observed. The dye-adsorbent powder with pale-yellow or grayish-yellow color has almost the same capacity for the maximum dye-adsorption, under the dark-condition, as that of the original dye-adsorbent powder (white-color).

Example-4

Figure 15A:
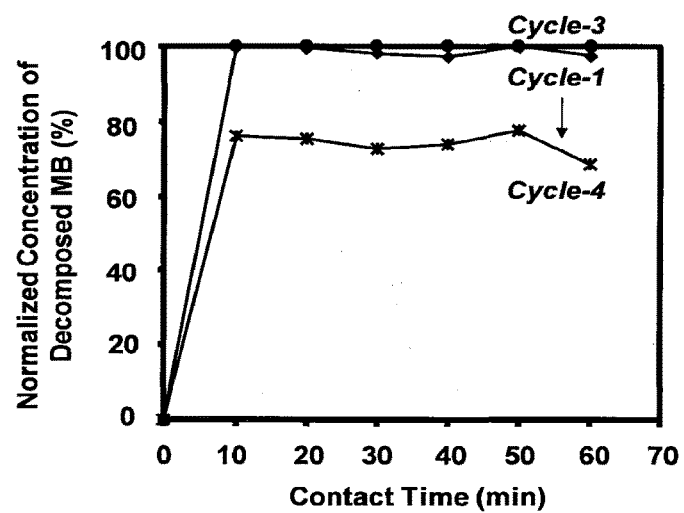
FIG. 15A represents a variation in the normalized concentration of decomposed MB as a function of contact time, obtained using the anatase-$TiO_2$ nanotubes, under the dark-condition ("one-step" dye-removal method)
Figure 15B:
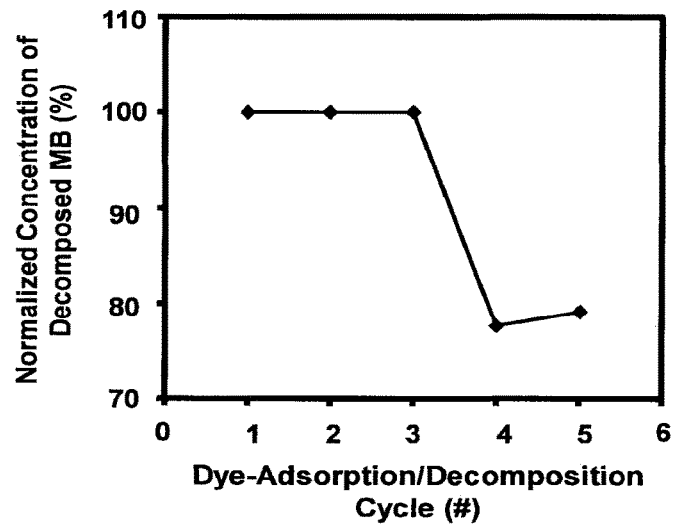
FIG. 15B represents a variation in the maximum normalized concentration of decomposed MB as a function of number of cycle involving simultaneous dye-adsorption and dye-decomposition, obtained using the anatase-$TiO_2$ nanotubes, under the dark-condition ("one-step" dye-removal method).

In another set of experiments, anatase-TiO$_2$ nanotubes (0.4 g·L$^{-1}$) are utilized for the removal of MB dye (7.5 µmol·L$^{-1}$), under the dark-condition, from 1 M H$_2$O$_2$ solution (75 ml) via simultaneous dye-adsorption and dye-decomposition using a "one-step" dye-removal method. The obtained variation in the normalized decomposed MB dye concentration as a function of contact time in the dark, for different cycles, is presented in FIG. 15(a). The variation in the maximum normalized decomposed MB dye concentration as a function of number of dye-adsorption/decomposition cycle is presented in FIG. 15(b). It is observed that, in the cycle-1, ~100% MB dye decomposition is reached in 10 min, FIG. 15(a), which is retained for 3 successive cycles of dye-adsorption/decomposition. After every cycle, the powder is filtered using a centrifuge (3500 rpm) and dried in an oven at 90° C. for 15 h before the next cycle of dye-adsorption. After cycle-4, the MB dye adsorption/decomposition capacity is reduced to ~78%. At the end of cycle-5 (not shown in FIG. 15(a) for clarity), total 28 mg·g$^{-1}$ of MB dye is simultaneously adsorbed and decomposed on the surface of anatase-TiO$_2$ nanotubes. The net dye-removal rate involving simultaneous dye-adsorption and dye-decomposition in the dark is estimated to be 16 mg·g$^{-1}$·h$^{-1}$. Hence, the comparison shows that under the dark-condition, the "one-step" dye-removal method is almost 20 times quicker than the "two-step" dye-removal method (FIG. 12 and example-3).

Figure 16:
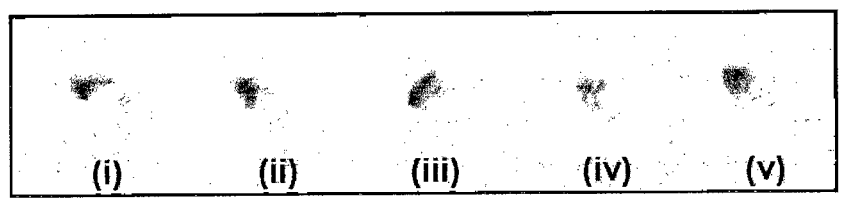
FIG. 16 represents variation in the color of anatase-$TiO_2$ nanotubes powder under different conditions (i) pure (as-synthesized); (ii-v) cycle-2 to cycle-5 involving simultaneous dye-adsorption and dye-decomposition under the dark-condition ("one-step" dye-removal method).

The variation in the original white-color of the anatase-TiO$_2$ nanotubes dye-adsorbent powder after each successive dye-adsorption/decomposition cycle in a "one-step" dye-removal method, under the dark-condition, is presented in FIG. 16. It is seen that, the original white-color of the dye-adsorbent powder changes to grayish-yellow after each successive dye-adsorption/decomposition cycle. The blue-color as observed in a "two-step" dye-removal method, FIG. 14, is not observed in the "one-step" dye-removal method due to the simultaneous dye-adsorption and dye-decomposition occurring in a single aqueous solution.

Example-5

The net MB dye removal rates (including the dye-adsorption and dye-decomposition) obtained under different test-conditions, as described in examples-1 to 4, are summarized in Table 1. It is noted that although the surface-cleaning treatments under the UV-radiation and sunlight (photocatalysis) are well-known processes, it also works effectively under the dark-condition for the H$_2$Ti$_3$O$_7$ and anatase-TiO$_2$ nanotubes in an aqueous H$_2$O$_2$ solution. Moreover, the "one-step" dye-removal is a continuous process which can remove the MB dye at the rate which is 7-20 times faster relative to that of "two-step" dye-removal process.

During the surface-cleaning treatment of a "two-step" dye-removal method, under the radiation-exposure (UV or sunlight), the electron/hole pairs are effectively generated within the H$_2$Ti$_3$O$_7$ and anatase-TiO$_2$ nanotubes.

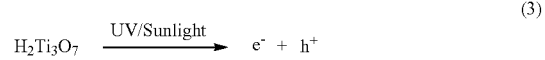
(3)

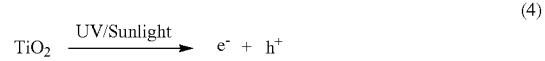
(4)

The photo-induced electrons then directly degrade the H$_2$O$_2$ to —OH.

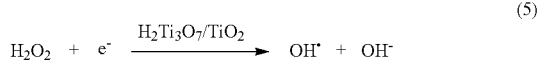
$$H_2O_2 + e^- \xrightarrow{H_2Ti_3O_7/TiO_2} OH^\cdot + OH^- \quad (5)$$

$$OH^- + h^+ \xrightarrow{H_2Ti_3O_7/TiO_2} OH^\cdot \quad (6)$$

The $H_2O_2$ can directly absorb UV-radiation having the wavelength below 254 nm, or the microwave or ultrasonic energy, generating —OH.

$$H_2O_2 \xrightarrow{UV \le 254\ nm} 2OH^\cdot \quad (7)$$

The —OH. generated via reactions presented in Eqs. 5, 6, and 7, are then responsible for the MB dye decomposition on the surface of $H_2Ti_3O_7$ and anatase-$TiO_2$ nanotubes.

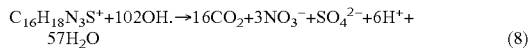
$$C_{16}H_{18}N_3S^+ + 102OH^\cdot \rightarrow 16CO_2 + 3NO_3^- + SO_4^{2-} + 6H^+ + 57H_2O \quad (8)$$

In this invention, the $H_2Ti_3O_7$ nanotubes are not highly crystalline, FIG. 1(b). As a result, the electron/hole pair generation, Eq. 3, is not very effective in these nanotubes under an exposure to the UV-radiation or sunlight. Moreover, the UV-radiation used in this invention peaks at ~360 nm, which does not have sufficient energy to directly decompose the $H_2O_2$ molecules into —OH. via reaction mechanism presented in Eq. 7. In addition to this, the dye-decomposition has been observed on the surface of $H_2Ti_3O_7$ and anatase-$TiO_2$ nanotubes even under the dark-condition in the "two-step" and "one-step" dye-removal methods. Under the dark-condition, neither of the mechanisms presented in Eqs. 5, 6, and 7 are effective to produce the —OH. This strongly suggests that, in the present invention, the above reaction mechanisms are possibly in a dormant mode. It appears that, some other mechanism is strongly effective in the MB dye decomposition on the surface of $H_2Ti_3O_7$ and anatase-$TiO_2$ nanotubes during the surface-cleaning treatments. Since the nanotubes of $H_2Ti_3O_7$ and anatase-$TiO_2$ exhibit very high specific surface-area, they possess large concentration of super-oxide ions ($O_2^-$ or $O^-$ ions) on the surface.

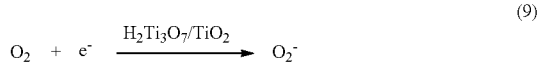
$$O_2 + e^- \xrightarrow{H_2Ti_3O_7/TiO_2} O_2^- \quad (9)$$

It is believed here that these super-oxide ions react with $H_2O_2$ to produce —OH. (along with the reactions presented in Eqs. 5, 6, and 7), which then attack and degrade the MB dye molecules via the reaction mechanism presented in Eq. 8.

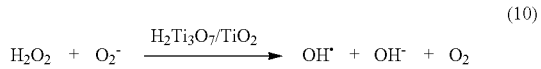
$$H_2O_2 + O_2^- \xrightarrow{H_2Ti_3O_7/TiO_2} OH^\cdot + OH^- + O_2 \quad (10)$$

Figure 17:
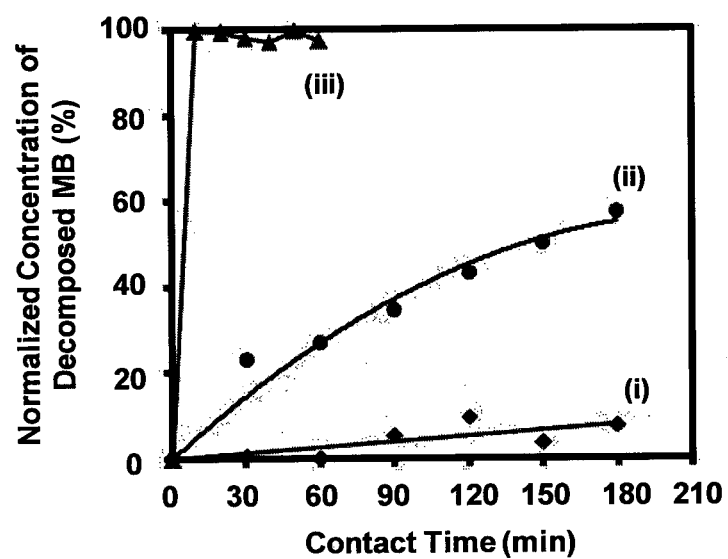
FIG. 17 represents variation in the maximum normalized concentration of decomposed MB as a function of contact time, obtained using anatase-$TiO_2$ nanotubes powder, in the dark-condition of "one-step" dye-removal method under different conditions—pure $H_2O$ (i) and 1 M $H_2O_2$ (ii, iii).

Hence, the MB dye can be adsorbed and decomposed, under the dark-condition, on the surface of $H_2Ti_3O_7$ and anatase-$TiO_2$ nanotubes. The latter can be recycled for the next-cycles of dye-adsorption and dye-decomposition (either simultaneous or conducted in the different aqueous solutions) under dark-condition. Hence, the process of dye-removal using the combination of $H_2O_2$ and $H_2Ti_3O_7$/anatase-$TiO_2$ nanotubes is termed here as a "Dark-Catalysis". For the complete dye-decomposition via reaction presented in Eq. 10, the presence of both $H_2O_2$ and nanotubes ($H_2Ti_3O_7$ or anatase-$TiO_2$) is essential as is evident from FIG. 17. The presence of only one reactant cannot completely decompose the dye typically under the dark-condition. It is also to be noted that the above mechanism is also valid when the nanotubes are coated on a substrate; for example, magnetic nanocomposite having a "core-shell" structure with the nanotubes-coating of a dye-adsorbent as a shell and a magnetic ceramic particle as a core. Moreover, the oxide-based semiconductor nanotubes of tin oxide ($SnO_2$), zinc oxide (ZnO), iron oxide ($Fe_2O_3$, $Fe_3O_4$), silver oxide ($Ag_2O$), and palladium oxide (PdO) would also be suitable for this application. The nanotubes may or may not be processed via hydrothermal. It is also possible that the strong oxidizers, other than $H_2O_2$, may decompose an organic synthetic-dye under the dark-condition in the presence of nanotubes by a mechanism different than that described in this example. It is also obvious that the semiconductor oxide nanotubes of this example may be either doped with the noble or transition metal-cations, or surface-deposited with the noble or transition metal-cations in the oxidized or reduced form which may favor the Fenton-driven oxidation to occur under the dark-condition.

Example-6

The industrial effluent sample containing 2% Direct Dye Blue 5GLL of Vijay Textile Mills, Ahmedabad, Gujarat, India was received from the Rubmach Industries, Ahmedabad, Gujarat, India. In order to remove the reactive-dye from the textile effluent sample following procedure was followed. 20 ml of textile-effluent sample containing the reactive-dye was diluted to 200 ml using 6 wt. % (1.6 M) $H_2O_2$ solution. 75 ml suspension was prepared by adding 45 ml of this dye solution to 30 ml 6 wt. % (1.6 M) $H_2O_2$ solution followed by the addition of 0.4 g·L$^{-1}$ of hydrogen titanate nanotubes. The resulting suspension was then stirred continuously in the dark-condition using a magnetic stirrer for 48 h. In FIG. 18, first two solutions correspond to those obtained at the start and after the contact time of 48 h following the filtering of the catalyst-powder using a centrifuge. The initial violet-color of the dye-solution is noted to fade after the "one-step" dye-removal process conducted in the dark-condition for 48 h. The original white-color catalyst-powder becomes pale-yellow, which is consistent with the observation made earlier with the MB dye. In order to accelerate the reactive-dye decomposition, after separating the pale-yellow catalyst-powder using a centrifuge, fresh 15 ml of 6 wt. % (1.6 M) $H_2O_2$ solution and 0.4 g·L$^{-1}$ of hydrogen titanate nanotubes were added to 30 ml of dye-solution obtained after 48 h of contact time. As seen in FIG. 18, additional 5 h of contact time (total 53 h) results in almost complete decomposition of the reactive-dye in the dark-condition. The solution obtained after the total contact time of 53 h exhibits a pale-yellow color at the bottom which is due to very small amount of suspended hydrogen titanate nanotubes which could not be separated using a centrifuge and were settled via gravity. Thus, it is successfully demonstrated that the reactive-dye Direct Dye Blue 5GLL can be decomposed from the textile-effluent sample in the dark-condition via "one-step" dye-removal process.

Example-7

The "two-step" and "one-step" dye-removal processes of present invention, involving the MB dye-adsorption and its decomposition in an aqueous solution, under the dark-condition without the use of an external power-source, using the hydrothermally processed nanotubes of $H_2Ti_3O_7$ or anatase-$TiO_2$ and $H_2O_2$ as a strong oxidizer, and the subsequent recycling of recovered and dried nanotubes for the next-cycle of dye-adsorption and/or dye-decomposition, conducted under the dark-condition without the use of an external power-source, are summarized in FIGS. 19 and 20. In FIG. 19, the step-1 ((a) to (d)) involves the dye-adsorption on the surface of nanotubes under the dark-condition which is a conventional step. However, the step-2 ((e) to (h)) involves the decomposition of surface-adsorbed dye, under the dark-condition without the use of an external power-source, in an aqueous solution containing $H_2O_2$ as a strong-oxidizer, followed by the recycling of recovered and dried nanotubes for the next-cycle of dye-adsorption conducted under the condition. On the other hand, the "one-step" dye-removal process as shown in FIG. 20 involves the simultaneous dye-adsorption and dye-decomposition conducted, under the dark-condition without the use of an external power-source, in an aqueous solution, containing the hydrothermally processed nanotubes of $H_2Ti_3O_7$ or anatase-$TiO_2$ and $H_2O_2$ as a strong oxidizer. The recovered and dried nanotubes can be recycled as catalyst for the next-cycle of simultaneous dye-adsorption and dye-decomposition conducted under the condition without the use of an external power-source.

In summary, through the example-1 to example-7, it is demonstrated the followings:
(1) The decomposition of an organic synthetic-dye in an aqueous solution under the dark-condition without the use of an external power-source.
(2) The recycling of semiconductor oxide nanotubes-based dye-adsorbents via dark-catalysis without the use of an external power-source.
(3) The use of combination of hydrothermally processed semiconductor oxide ($H_2Ti_3O_7$ or anatase-$TiO_2$) nanotubes and a strong oxidizer, such as $H_2O_2$, for decomposing an organic synthetic-dye in an aqueous solution under the dark-condition without the use of an external power-source.

In all the above examples, the concept of process for Decomposition of Organic Synthetic-Dyes using Semiconductor Oxides Nanotubes via Dark-Catalysis involving No External Power-Source have been demonstrated using a basic dye (MB) and the feasibility of commercial exploitation has been demonstrated via real time testing of the textile effluent sample containing a reactive-dye (Direct Dye Blue 5GLL). The examples presented here are for the illustrative purpose only and do not limit the scope of the present invention in view of the range of experimental parameters and the type of dye to be decomposed.

The Main Advantages of the Present Invention are

1. It provides Process for Decomposition of Organic Synthetic-Dyes using Semiconductor-Oxides Nanotubes via Dark-Catalysis, to use and recycle the nanotubes-based dye-adsorbent powder for the dye-removal from an aqueous solution.
2. It provides techniques for removing the previously adsorbed-dye from the surface of nanotubes-based dye-adsorbent powder under the dark-condition without the use of any external power-source such as the applied potential-difference, microwave, ultrasonicator, and other to save the energy-consumption.
3. It provides techniques to enhance the effective specific surface-area of the nanotubes-based dye-adsorbent powder, without both an exposure to external-radiation such as the UV, visible, fluorescent, solar, or heat and the use of any external power-source such as the applied potential-difference, microwave, ultrasonicator, and other, after the several cycles of dye-adsorption under the dark-condition.
4. It provides techniques to restore the original high dye-adsorption capacity of the nanotubes-based dye-adsorbent powder, without both an exposure, to external-radiation such as the UV, visible, fluorescent, solar, or heat and the use of any external power-source such as the applied potential-difference, microwave, ultrasonicator, and other, after the several cycles of dye-adsorption under the dark-condition.
5. It provides techniques to simultaneously adsorb and decompose the dye in one aqueous solution conducted under the dark-condition, without both an exposure to external-radiation such as the UV, solar, visible, fluorescent, or heat and the use of any external power-source such as the applied potential-difference, microwave, ultrasonicator, and other, to save the energy-consumption.
6. It provides techniques to recycle the nanotubes-based dye-adsorbent powder, which make its commercialization possible without both an exposure to external-radiation such as the UV, solar, visible, fluorescent, or heat and the use of any external power-source such as the applied potential-difference, microwave, ultrasonicator, and other.
7. It provides methods to decompose the organic synthetic-dye, in an aqueous solution under the dark-condition without the use of an external power-source, which are faster, efficient, easy-to-operate, and cost-effective than the conventional dye-decomposition methods.
8. It provides methods to decompose the organic synthetic-dye, in an aqueous solution under the dark-condition without the use of an external power-source, which can be operated in any part of the world (hot or cold) at any time (day or night).

What is claimed is:
1. A process for decomposition of organic synthetic-dyes using semiconductor-oxides nanotubes via dark-catalysis which comprises the steps of:
(i) suspending nanotubes-based dye-adsorbent powder in an aqueous solution of organic synthetic-dye, wherein the concentration of nanotubes-based dye-adsorbent powder is in the range of 0.1-3.0 g $L^{-1}$;
(ii) adding a strong oxidizer in the above solution of step (i), stirring the suspension, under the dark-condition, using a magnetic or overhead stirrer for 10-3600 min for simultaneous dye-adsorption and dye-decomposition on the powder-surface, designated as "one-step method", wherein the net dye-removal rate is in the range of 1-100 mg $g^{-1}$ $h^{-1}$;
(iii) separating the powder from the solution of step (ii) using a centrifuge operated at 2000-4000 rpm;
(iv) drying the powder in an oven at 70-90° C. for 15-20 h; and
(v) recycling the dried-powder to repeat step-(i) to step-(iv) for the next cycle of dye-decomposition under the dark-condition.
2. The process as claimed in claim 1, wherein the nanotubes-based dye-adsorbent powder consists of high surface-area nanotubes selected from the group of $H_2Ti_3O_7$ and anatase-$TiO_2$ processed via hydrothermal.
3. The process as claimed in claim 1, wherein the organic synthetic-dye is selected from the group consisting of basic, acidic, and reactive-dyes in an aqueous solution.

4. The process as claimed in claim 1, wherein the strong oxidizer is selected from a group consisting of $H_2O_2$ and any other material containing the OH' group except water.

5. The process as claimed in claim 1, wherein $H_2O_2$ is used as the strong oxidizer in the concentration range of 0.5-15 M (3-50 wt. %).

6. The process as claimed in claim 1, wherein the dried nanotubes powder obtained at step (iv) retains adsorbent capacity in the one-step method of dye decomposition.

7. The process as claimed in claim 1, wherein the recycled dye-adsorbent powder is pale-yellow in color having the same capacity for the maximum dye-adsorption, under the dark-condition, as that of the original white-color dye-adsorbent powder.

8. The process as claimed in claim 1, wherein the step (ii) is replaced by the step of: transferring the dye-adsorbent powder treated with the solution of organic synthetic dye in step (i) to another aqueous solution containing a strong oxidizer and stirring the suspension, under the dark-condition, designated as "two-step method", using a magnetic or overhead stirrer for 10-3600 min for the complete dye-decomposition on the powder-surface.

9. The process as claimed in claim 8, wherein the dried nanotubes powder obtained at step (iv) retains adsorbent capacity in the two-step method of dye decomposition.

10. The process as claimed in claim 8, wherein the concentration of nanotubes-based dye-adsorbent powder with the surface-adsorbed organic synthetic-dye is in the range of 0.1-3.0 g $L^{-1}$ and the net dye-removal rate, involving the dye-adsorption and dye-decomposition occurring in separate aqueous solutions under the dark-condition, designated as "two-step method", is in the range of 0.1-10 mg $g^{-1}$ $h^{-1}$.

* * * * *